(12) United States Patent
Ando et al.

(10) Patent No.: US 8,436,570 B2
(45) Date of Patent: May 7, 2013

(54) MOTOR DRIVING SYSTEM, MOTOR CONTROLLER, AND SAFETY FUNCTION EXPANDER

(75) Inventors: Kunimasa Ando, Fukuoka (JP); Tsutomu Kubo, Fukuoka (JP); Keisei Inoki, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 280 days.

(21) Appl. No.: 13/074,019

(22) Filed: Mar. 29, 2011

(65) Prior Publication Data

US 2011/0241447 A1    Oct. 6, 2011

(30) Foreign Application Priority Data

Mar. 30, 2010  (JP) ................ 2010-078510
Nov. 4, 2010   (JP) ................ 2010-247490

(51) Int. Cl.
*G05B 19/4062* (2006.01)
*H02P 3/02* (2006.01)

(52) U.S. Cl.
USPC .................... 318/565; 318/490; 340/648

(58) Field of Classification Search ........... 318/560, 318/563, 565, 568.24, 490; 340/635, 648
See application file for complete search history.

(56) References Cited

U.S. PATENT DOCUMENTS

| 7,253,577 B2 * | 8/2007 | Campbell et al. ............ 318/563 |
| 2010/0007301 A1 * | 1/2010 | Ochsenbein et al. ......... 318/563 |
| 2010/0117585 A1 * | 5/2010 | Fitch et al. ............... 318/568.12 |
| 2010/0164423 A1 * | 7/2010 | Nakayama et al. .......... 318/565 |
| 2011/0221377 A1 * | 9/2011 | Ueno ........................ 318/565 |

FOREIGN PATENT DOCUMENTS

| JP | 05-053631 | 3/1993 |
| JP | 06-086448 | 3/1994 |
| JP | 2005-176493 | 6/2000 |
| JP | 2005-044074 | 2/2005 |
| JP | 2006-011730 | 1/2006 |
| JP | 2007-283448 | 11/2007 |
| JP | 2009-187531 | 8/2009 |

OTHER PUBLICATIONS

Extended European Search Report for corresponding EP Application No. 11158957.8.-1239, Mar. 21, 2012.

* cited by examiner

*Primary Examiner* — Eduardo Colon Santana
(74) *Attorney, Agent, or Firm* — Ditthavong Mori & Steiner, P.C.

(57) ABSTRACT

The motor driving system includes a driving state amount detector configured to detect a driving state amount, a motor control part configured to perform a power supply control, a higher control part capable of outputting a higher control command to the motor control part, and a safety requesting part that inputs a safety request signal to the motor control part. The motor control part includes a motor control circuit part that performs the power supply control, a mode selecting and executing part configured to select and execute either a first safety function mode or a second safety function mode, and a comparing and monitoring processing part that compares the driving state amount and a predetermined operation monitoring pattern, when the safety request signal is inputted.

18 Claims, 15 Drawing Sheets

FIG. 10  SAFE POSITION MONITORING FUNCTION WITH DELAY (SPM-D): Safe Stop 2
(CONTROLLER DECELERATION MODE)

FIG. 12 SAFETY LIMIT SPEED MONITORING FUNCTION WITH DELAY (SLS-D) (CONTROLLER DECELERATION MODE)

FIG. 14 ACTIVE DECELERATION MODE, POSITION COMMAND FORM

MOTOR DRIVING SYSTEM, MOTOR CONTROLLER, AND SAFETY FUNCTION EXPANDER

CROSS-REFERENCE TO RELATED APPLICATION

The present application claims priority from Japanese Patent Application No. 2010-078510, which was filed on Mar. 30, 2010 and Japanese Patent Application No. 2010-247490, which was filed on Nov. 4, 2010, the disclosure of which are incorporated herein by reference in its entirety.

BACKGROUND OF THE INVENTION

1. Field of the Invention

The present embodiment disclosed relates to a motor driving system, a motor controller, and a safety function expander for driving and controlling a motor that serves as a driving source of a load machine of industrial machinery.

2. Description of the Related Art

In the field of industrial machinery, such as machine tools, for example, many techniques for controlling a motor that serves as a driving source to ensure the safety thereof have been proposed as follows.

For example, in JP, A, 2006-011730 there is described a servomotor controller that is capable of suppressing any large torque fluctuations that may occur when the servomotor is stopped.

In addition, in JP, A, 05-053631, for example, there is described a controller that provides an instantaneous stop function to a motor that drives the joints of a robot.

In addition, in JP, A, 06-086448, for example, there is described a servomotor driving apparatus that stops a motor as quickly as possible after error detection.

There has been a call for a motor driving system capable of readily ensuring the safety of a system variedly configured as well as the safety standard compliance of the overall industrial machine.

SUMMARY OF THE INVENTION

According to the first aspect of the present invention, there is provided a motor driving system comprising: a motor for driving a load machine; a driving state amount detector that is mechanically connected to the motor and configured to detect a driving state amount related to the motor; a motor control part configured to perform a power supply control to the motor; a higher control part capable of outputting a higher control command to the motor control part and controlling the power supply control by the motor control part; and a safety requesting part that inputs a safety request signal to the motor control part when predetermined conditions under which the motor should be decelerated or stopped are satisfied; wherein: the motor control part comprises: a motor control circuit part that performs the power supply control in accordance with a predetermined driving control command while referring to the driving state amount as a feedback signal; a mode selecting and executing part configured to select and execute either a first safety function mode in which deceleration control or stop control of the motor is performed by inputting the higher control command that is in accordance with a predetermined higher control operation pattern to the motor control circuit part as the driving control command, or a second safety function mode in which deceleration control or stop control of the motor is performed by inputting an internal deceleration command generated inside the motor control part that is in accordance with a predetermined self-control operation pattern to the motor control circuit part as the driving control command, when the safety request signal is inputted; and a comparing and monitoring processing part that compares the driving state amount and a predetermined operation monitoring pattern and monitors whether or not the driving state amount exceeds the operation monitoring pattern, when the safety request signal is inputted.

According to the first aspect of the present invention, during normal operation, a higher control part inputs a higher control command that provides preferred driving operation instructions to a motor control part, and the motor control part inputs the inputted higher control command as is to an internal motor control circuit part as a driving control command. Then, the motor control circuit part performs the power supply control to the motor in accordance with the driving control command while referring to the driving state amount detected by the driving state amount detector as a feedback signal, making it possible for the overall motor driving system to stably drive the motor with high accuracy in accordance with the higher control command of the higher control part.

Further, when a predetermined state requiring motor deceleration and stopping occurs, a safety requesting part inputs a safety request signal to the motor control part, and a mode selecting and executing part of the motor control part selects and executes either a first safety function mode or a second safety function mode. Note that mode selection by this mode selecting and executing part may be made according to which mode was selected for execution in a setup operation performed in advance by a user, for example.

According to the above-described first safety function mode, even in a predetermined state that requires motor deceleration and stopping, the higher control command from the higher control part is inputted as is into the motor control circuit part as a driving control command, i.e., motor deceleration control and stop control are performed in accordance with the higher control command from the higher control part. However, in such a case, the system requires a system configuration in which the safety request signal from the safety requesting part is inputted to the higher control part as well, and further requires a function within the higher control part itself that is capable of outputting the higher control command in accordance with a higher control operation pattern that satisfies the safety standard criteria when the safety request signal is inputted.

Further, according to the above-described second safety function mode, only in a case of the predetermined state in which motor deceleration and stopping are required, an internal decelerating command that is in accordance with a self-control operation pattern that satisfies safety standard criteria is generated inside the motor control part and inputted as a driving control command into the motor control circuit part. That is, the motor control part itself rather than the higher control part autonomously performs motor deceleration control and stop control. In such a case, neither a system configuration that inputs a safety request signal to the higher control part nor a function that outputs the higher control command in accordance with a higher control operation pattern to the higher control part itself is required.

According to the above, regardless of the existence or non-existence of a system configuration that inputs a safety request signal to a higher control part, or the existence or non-existence of a function that outputs a higher control command in accordance with the higher control operation pattern of the higher control part itself, the motor control part is capable of reliably executing a predetermined deceleration and stop operation process in a predetermined state in which motor deceleration and stopping are required, that is, intensively ensuring safety standard compliance on its own.

However, when the higher control part outputs a higher control command that is in accordance with a higher control operation pattern in the above-described first safety function mode, or when the motor control part generates an internal deceleration command in accordance with the self-control operation pattern in the above-described second safety function mode, for example, the motor velocity does not always adhere to the higher control command or the internal deceleration command, causing the motor control circuit part to sometimes not execute the motor deceleration and stop operation process to an extent that actually satisfies the safety standard criteria. The cause of such failure is presumably an error in or failure of the motor or driving state amount detector, some type of action received from the load side connected to the motor that is unrelated to the higher control command or internal deceleration command, or the like.

In response, the comparing and monitoring processing part of the motor control part compares a predetermined operation monitoring pattern that satisfies safety standard criteria with the driving state amount of the motor, and monitors whether or not the driving state amount exceeds the operation monitoring pattern. With this arrangement, when the actual driving state amount of the motor exceeds the operation monitoring pattern resulting in an operating state that deviates from safety standards, this state can be detected, making it possible to take suitable measures and thus more reliably ensure safety standard compliance.

As a result, according to the first aspect of the present invention, it is possible to accommodate industrial machines of variegated system configurations with versatility and readily ensure safety as well as safety standard compliance.

According to the 15th aspect of the present invention, there is provided a motor controller that performs a power supply control to a motor based on a higher control command inputted from a higher control part, and receives a driving state amount related to the motor that is detected by a driving state amount detector mechanically connected to the motor, and a safety request signal outputted from a safety requesting part when predetermined conditions under which the motor should be decelerated or stopped are satisfied, the motor controller comprising: a motor control circuit part that performs the power supply control in accordance with a predetermined driving control command while referring to the driving state amount as a feedback signal; and a mode selecting and executing part configured to select and execute either a first safety function mode in which deceleration control or stop control of the motor is performed by inputting the higher control command that is in accordance with a predetermined higher control operation pattern to the motor control circuit part as the driving control command, or a second safety function mode in which deceleration control or stop control of the motor is performed by inputting an internal deceleration command generated inside the motor control part that is in accordance with a predetermined self-control operation pattern as the driving control command, when the safety request signal is inputted.

According to the fifteenth aspect of the present invention, during normal operation, a higher control part inputs a higher control command that provides preferred driving operation instructions to a motor controller, and the motor controller inputs the inputted higher control command as is to an internal motor control circuit part as a driving control command. Then, the motor control circuit part controls the power supply to the motor in accordance with the driving control command while referring to the driving state amount detected by the driving state amount detector as a feedback signal, making it possible for the motor controller to stably drive the motor in accordance with the higher control command of the higher control part.

Further, when a predetermined state requiring motor deceleration and stopping occurs, a safety requesting part inputs a safety request signal to the motor controller, and a mode selecting and executing part of the motor controller selects and executes either a first safety function mode or a second safety function mode. Note that mode selection by this mode selecting and executing part may be made according to which mode was selected for execution in a setup operation performed in advance by a user, for example.

According to the above-described first safety function mode, even in a predetermined state that requires motor deceleration and stopping, the higher control command from the higher control part is inputted as is into the motor control circuit part as a driving control command, i.e., motor deceleration control and stop control are performed in accordance with the higher control command from the higher control part. However, in such a case, the system requires a system configuration in which the safety request signal from the safety requesting part is inputted to the higher control part as well, and further requires a function within the higher control part itself that is capable of outputting the higher control command in accordance with a higher control operation pattern that satisfies the safety standard criteria when the safety request signal is inputted.

Further, according to the above-described second safety function mode, only in a case of the predetermined state in which motor deceleration and stopping are required, an internal deceleration command that is in accordance with a self-control operation pattern that satisfies safety standard criteria is generated inside the motor controller and inputted as a driving control command to the motor control circuit part. That is, the motor controller itself rather than the higher control part autonomously performs motor deceleration control and stop control. In such a case, neither a system configuration that inputs a safety request signal to the higher control part nor a function that outputs the higher control command in accordance with a higher control operation pattern to the higher control part itself is required.

According to the above, regardless of the existence or non-existence of a system configuration that inputs a safety request signal to a higher control part, or the existence or non-existence of a function that outputs a higher control command in accordance with the higher control operation pattern of the higher control part itself, the motor controller is capable of reliably executing a predetermined deceleration and stopping operation process in accordance with an operation pattern that satisfies safety standard criteria in a predetermined state in which motor deceleration and stopping are required, that is, intensively ensuring safety standard compliance on its own.

As a result, according to the fifteenth aspect of the present invention, it is possible to accommodate industrial machines of variegated system configurations with versatility and readily ensure safety standard compliance.

According to the 18th aspect of the present invention, there is provided a motor driving system comprising: a motor for driving a load machine; driving state amount detection means mechanically connected to the motor and configured to detect a driving state amount related to the motor; motor control means configured to perform a power supply control to the motor; higher control means capable of outputting a higher control command to the motor control means and controlling the power supply control by the motor control means; and safety requesting means that inputs a safety request signal to the motor control means when predetermined conditions under which the motor should be decelerated or stopped are satisfied; wherein: the motor control means comprises: motor control circuit means that performs the power supply control in accordance with a predetermined driving control command while referring to the driving state amount as a feedback signal; mode selecting and executing means configured to select and execute either a first safety function mode in which deceleration control or stop control of the motor is performed by inputting the higher control command that is in accordance with a predetermined higher control operation pattern to the motor control circuit means as the driving control command, or a second safety function mode in which deceleration control or stop control of the motor is performed by inputting an internal deceleration command generated inside the motor control means that is in accordance with a predetermined self-control operation pattern to the motor control circuit means as the driving control command, when the safety request signal is inputted; and comparing and monitoring processing means that compares the driving state amount and a predetermined operation monitoring pattern and monitors whether or not the driving state amount exceeds the operation monitoring pattern, when the safety request signal is inputted.

DETAILED DESCRIPTION OF THE EMBODIMENTS

The following describes an embodiment of the aspect of the present invention with reference to accompanying drawings.

Figure 1:
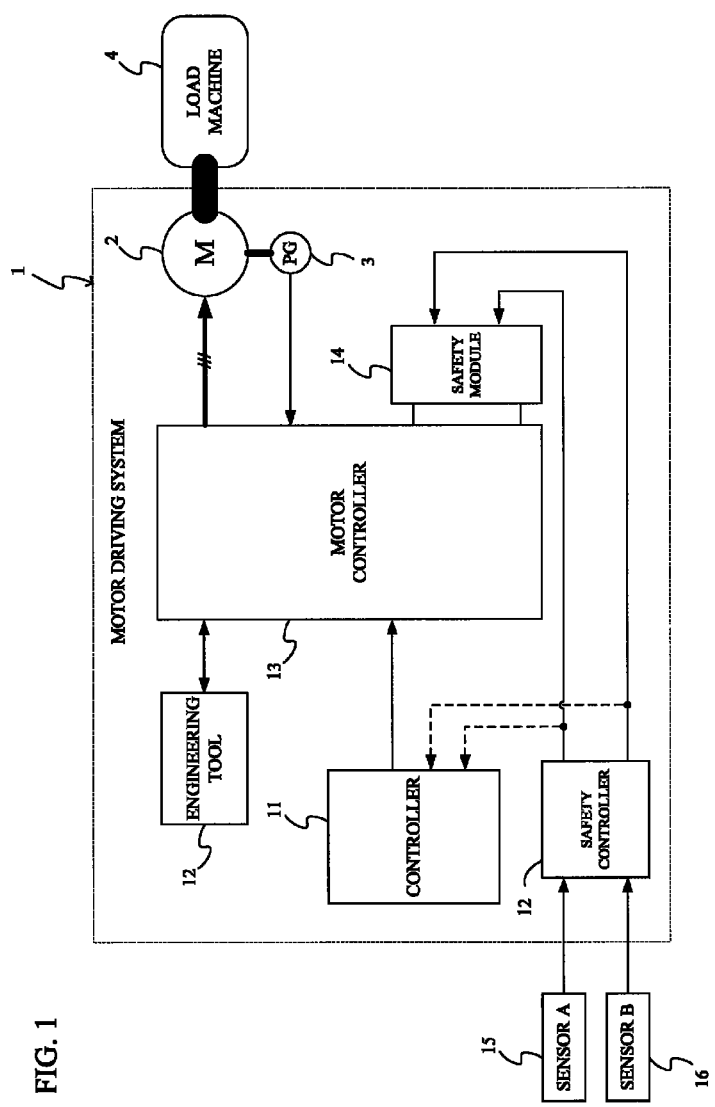
FIG. 1 is a function block diagram showing the functional configuration of a motor driving system according to an embodiment.

FIG. 1 is a function block diagram showing the functional configuration of a motor driving system according to an embodiment of the aspect of the present invention.

In FIG. 1, a motor driving system 1 comprises a motor 2, a position detector 3, a motor controller 13, a safety module 14, a controller 11, a safety controller 12, and an engineering tool 22.

Note that, in this FIG. 1, the connections between each of the above components and the flow of the signals transmitted therebetween are indicated by arrows, and the detailed internal configurations thereof will be described later. In addition, a signal line indicated by a dashed line in the figure may indicate a connection between components, depending on the case. The following schematically describes each of the above components.

The motor 2 is an actuator, such as a three-phase AC motor, that is connected to and drives a load machine 4 of an industrial machine such as a machine tool or robot, for example.

The position detector 3 comprises an encoder that is mechanically connected to the motor 2, for example, and performs the function of detecting the driving state amount, such as the driving position of the motor 2.

The motor controller 13 performs the function of controlling the power supply of the motor 2 using an internally provided motor control circuit part described in detail later to control the driving of the motor 2.

The safety module 14 is a function expander additionally connected to the motor controller 13, and performs the function of monitoring the driving state amount of the motor 2 using an internally provided comparing and monitoring part described in detail later, and outputting a power shutdown signal to the motor controller 13 to forcibly decelerate and stop the motor 2 based on a predetermined timing after input of a safety request signal from the safety controller 12 described later, when an operation state that deviates from this monitored state occurs.

The controller 11 performs the function of outputting to the motor controller 13 a higher control command for causing the motor 2 to perform a desired driving operation and controlling the driving of the motor 2 via power supply control by the motor controller 13. Note that the higher control command is generated and outputted in the form of either a position command or a velocity command.

The safety controller 12 performs the function of outputting a safety request signal to at least the above-described safety module 14 and, depending on the case, the above-described controller 11 in accordance with detected contents when sensors 15, 16, etc., provided to the industrial machine each detect a predetermined state in which the motor 2 should be decelerated and stopped, as described in detail later. (The output destination of the safety request signal will be described in detail later.)

The engineering tool 22 is an interface device that is connected to the above-described motor controller 13 as necessary, and performs display, setup, update, and other operations related to the optional settings and various parameter values of the various motor control functions inside the motor controller 13.

Note that, while not particularly shown, the above-described motor controller 13, safety module 14, controller 11, and safety controller 12 each individually comprise a CPU, ROM, RAM, and the like, and are capable of independently executing software processing.

Note that the above-described position detector 3 is equivalent to the driving state amount detector, the overall configuration of the integrally connected motor controller 13 and safety module 14 is equivalent to the motor control part, the controller 11 is equivalent to the higher control part, and the safety controller 12 is equivalent to the safety requesting part described in the claims. Further, the engineering tool 22 is equivalent to the setting part, and the safety module 14 unit is equivalent to the safety function expander. Further, the above-described position detector 3 is also equivalent to the driving state amount detection means, the overall configuration of the integrally connected motor controller 13 and safety module 14 is equivalent to the motor control means, the controller 11 is equivalent to the higher control means, and the safety controller 12 is equivalent to the safety requesting means described in the claims.

Figure 2:
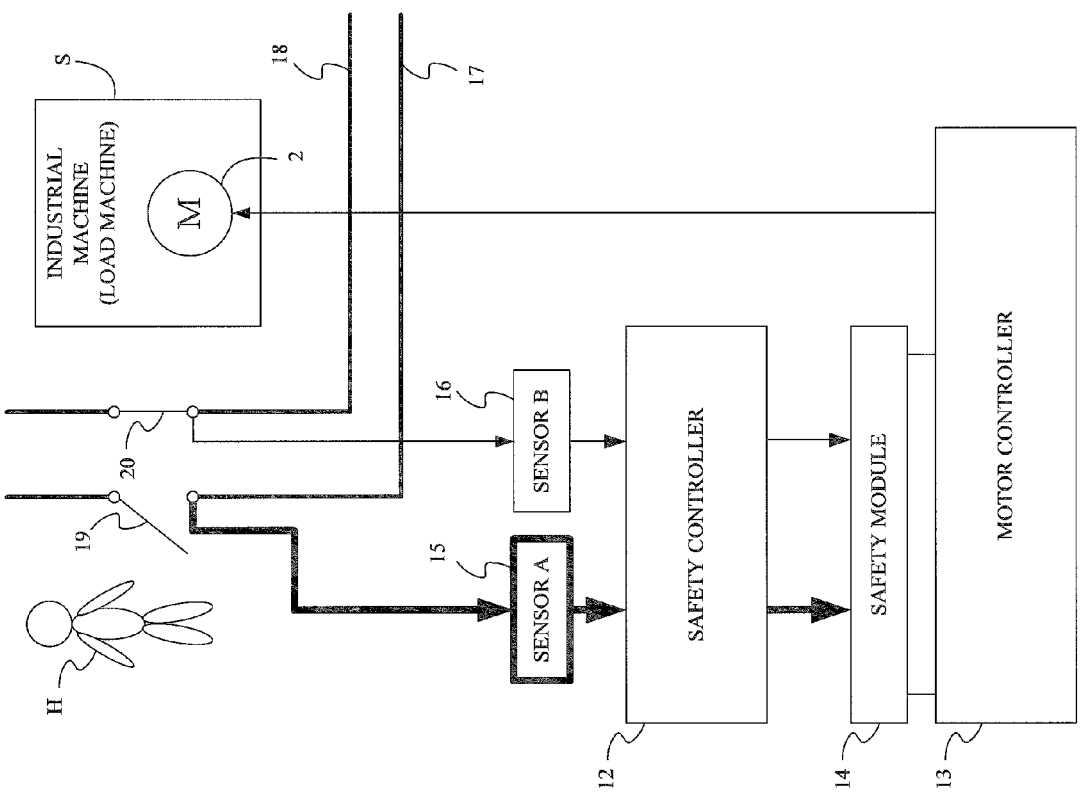
FIG. 2 is a function block diagram showing an example of a connection configuration of the sensors and safety controller.

FIG. 2 is a function block diagram showing an example of a connection configuration of the sensors 15 and 16 and the safety controller 12. Note that a bold signal line in the figure indicates a state of signal transmission, and a fine signal line in the figure indicates a state in which a signal is not output (the same holds true for each figure hereinafter). In addition, in FIG. 2, the controller 11 and the engineering tool 22 are not shown.

In FIG. 2, in this example, safety fences 17 and 18 are installed in duplex around the periphery of an industrial machine S comprising the load machine 4 driven by the motor 2, and the sensors 15 and 16 that respectively detect the opened/closed state of passage doors 19 and 20 of the safety fences 17 and 18 are provided. The sensor A 15 is provided to the outer passage door 19 of the outer safety fence 17 farther away from the industrial machine S, and the sensor B 16 is provided to the inner passage door 20 of the inner safety fence 18 closer to the industrial machine S.

When an operator H approaches the industrial machine S in order to perform urgent verification work, for example, first only the outer passage door 19 of the farther outer safety fence 17 is opened, causing only the sensor A 15 to output a detection signal to the safety controller 12 (the state indicated in FIG. 2), and then the inner passage door 20 of the closer inner safety fence 18 is also opened, causing the sensor B 16 to also output an additional detection signal to the safety controller 12. That is, in such a case, a time difference occurs in the timing at which the sensor A 15 and the sensor B 16 each output a detection signal. Further, if the two safety fences 17 and 18 are disposed sufficiently far apart, the operator H sometimes passes through only the farther outer safety fence 17, i.e., sometimes only the sensor A 15 and not the sensor B 16 outputs a detection signal, depending on the contents of the verification work of the operator H.

The safety controller 12 outputs two safety request signals respectively corresponding to the detected states of the sensors 15 and 16 to the safety module 14 as is, in accordance with the output timing of each of the detection signals of the sensors 15 and 16. Note that, although not particularly shown, when the safety module 14 verifies input of the safety request signals, transmission/reception of the safety request signals is completed when the safety module 14 returns a corresponding reply signal to the safety controller 12 and the safety controller 12 verifies input of this reply signal. Further, although not particularly shown, each of the safety request signals is transmitted twice (one safety request signal is transmitted using dual system wiring), making it also possible for the safety module 14 to detect the different safety request signals on both systems, detect and issue an alert regarding part failure in the event of a single random failure of an electric, electronic, or magnetic component, for example, and stop the control of the motor 2.

Then, when either of the sensors 15 or 16 outputs a detection signal, the industrial machine S needs to decelerate and stop the motor 2 taking into consideration the safety of the operator H. Differences in safety countermeasure support, however, occur in the safety module 14 and the motor controller 13 of this embodiment depending on whether the sensor A 15 outputs the detection signal (the outer passage door 19 of the farther outer safety fence 17 is opened) as in the example shown in the figure, or the sensor B 16 outputs the detection signal (the inner passage door 20 of the closer inner safety fence 18 is opened). That is, when only the outer passage door 19 of the farther outer safety fence 17 is opened, the likelihood that the operation of the industrial machine S will put the operator H at risk is relatively low, and thus the motor 2 may simply be decelerated to a predetermined velocity or less as described later in detail, for example, to ensure easy restoration to normal operation. On the other hand, when the inner passage door 20 of the closer inner safety fence 18 is opened, the likelihood that the operation of the industrial machine S will put the operator H at risk is relatively high, and thus the motor 2 needs to be reliably and quickly decelerated and stopped at the price of compromising restorability as described in detail later, for example.

The safety module 14 and the motor controller 13 of this embodiment thus respectively respond to the inputs of the two safety request signals and perform deceleration and stop control of the motor 2 with differences in control contents. Furthermore, in response to the occurrence of a state that puts the operator H at risk, requiring such deceleration and stop control of the motor 2, the motor controller 13 alternatively selects and executes either controller deceleration mode in which deceleration and stop control of the motor 2 is performed in accordance with a higher control command from the controller 11, or active deceleration mode in which deceleration and stop control of the motor 2 is performed in accordance with an internal deceleration command generated by the motor controller 13 itself.

Figure 3:
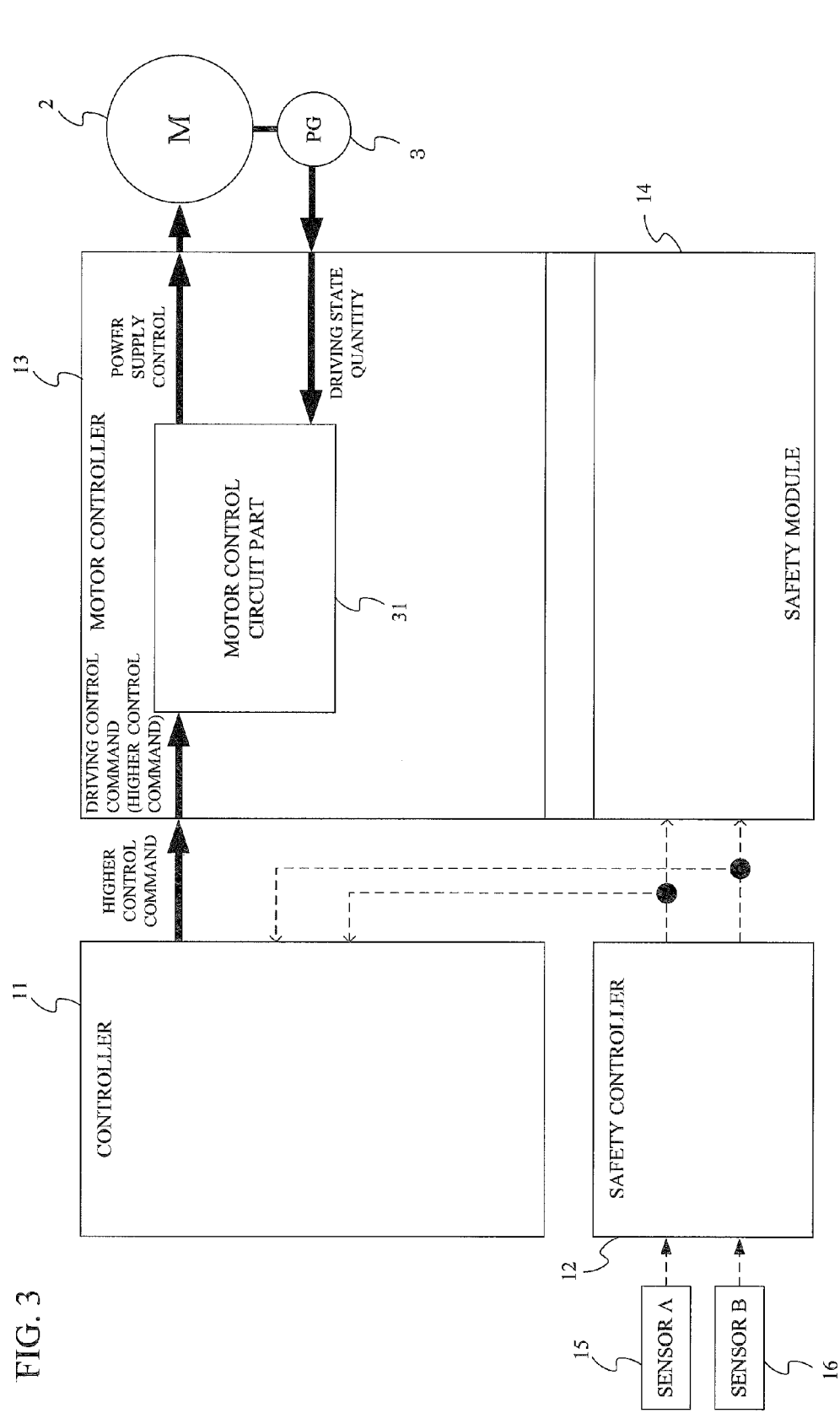
FIG. 3 is a diagram explaining the flow of signals within the motor driving system during normal operation.
Figure 4:
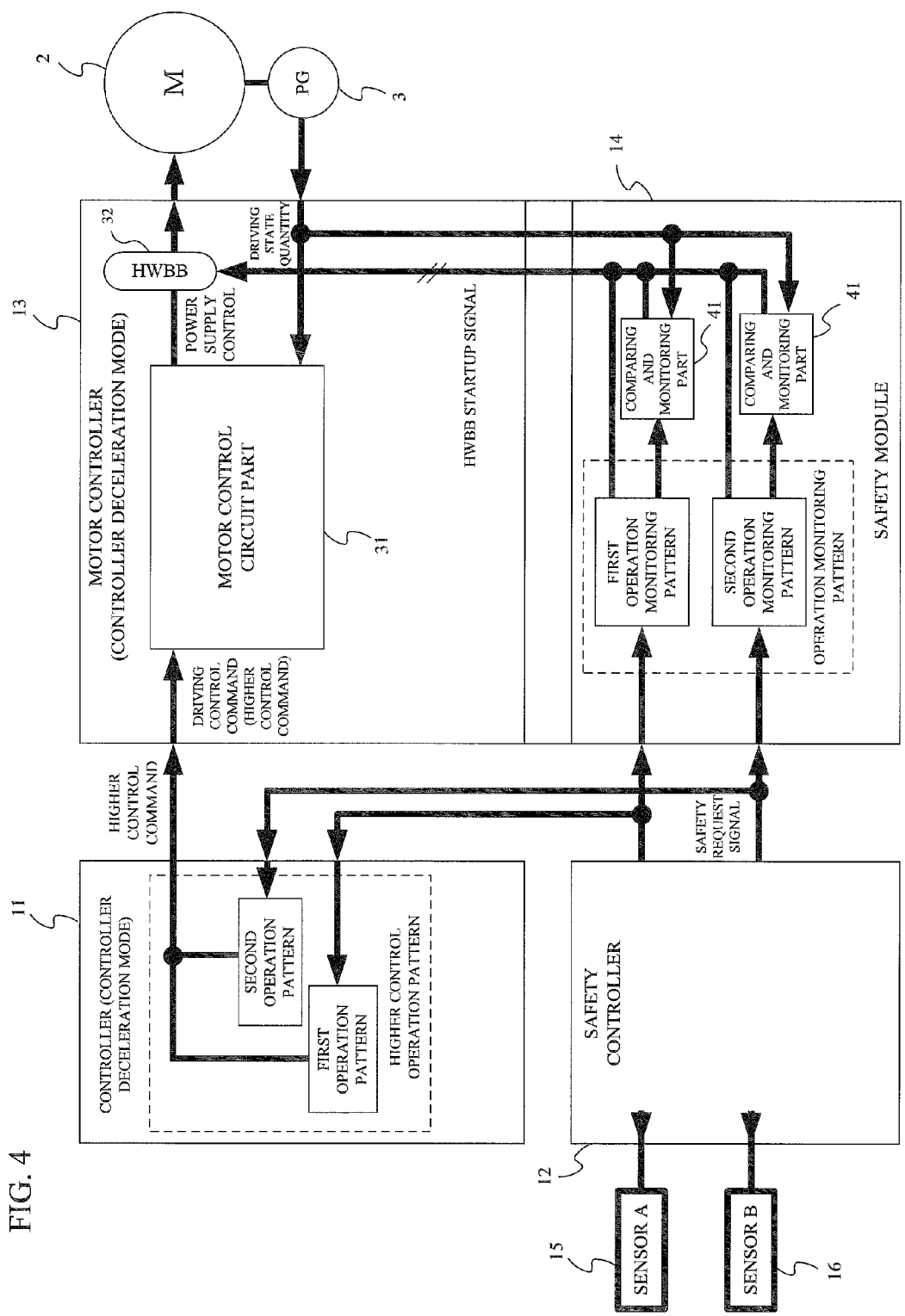
FIG. 4 is a diagram explaining the flow of signals within the motor driving system in control deceleration mode.
Figure 5:
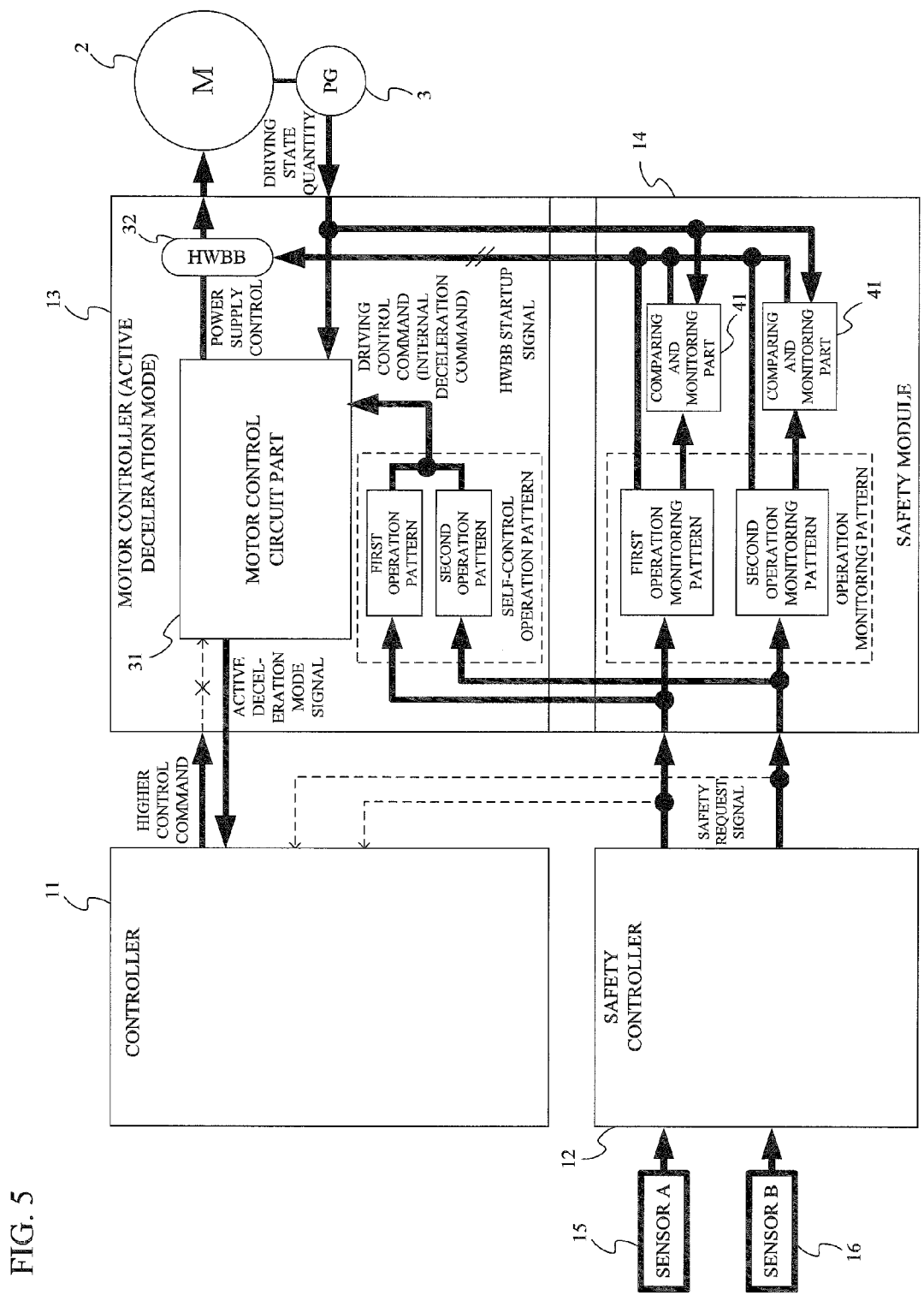
FIG. 5 is a diagram explaining the flow of signals within the motor driving system in active deceleration mode.

FIG. 3 to FIG. 5 are diagrams explaining the flow of the signals within the motor driving system 1. FIG. 3 corresponds to a normal operation period, FIG. 4 corresponds to a period when controller deceleration mode is executed, and FIG. 5 corresponds to a period when active deceleration mode is executed. Note that, in FIG. 3 to FIG. 5, a motor control circuit part 31 and an HWBB 32 provided inside the motor controller 13 are made of hardware circuits, while all other functional components inside the motor controller 13, the safety module 14, and the controller 11 are shown as software block executed by the respective CPUs provided therein. Note that the motor control circuit part 31 is equivalent to the motor control circuit means described in the claims.

In FIG. 3 to FIG. 5, as described above, the motor controller 13 comprises the motor control circuit part 31 internally comprising a hardware circuit and the HWBB (Hard Wire Base Block; not shown in FIG. 3) 32.

The motor control circuit part 31 performs the function of power supply control to the motor 2 in accordance with a predetermined driving control command (equivalent to the higher control command from the controller 11, for example) while referring to the driving state amount of the motor 2 detected by the position detector 3 as a feedback signal.

The HWBB 32 performs the function of shutting down the power supply to the motor 2 from the above-described motor control circuit part 31 when an HWBB startup signal is inputted (the detailed configuration will be described later with reference to FIG. 7). Note that this HWBB 32 is equivalent to the power supply shutdown part and the HWBB startup signal is equivalent to the power supply shutdown signal described in the claims.

First, during normal operation of the industrial machine S, as shown in FIG. 3, the controller 11, for example, outputs a higher control command generated according to the execution of a program stored in advance to the motor controller 13 so as to provide desired driving operation instructions, and the motor controller 13 inputs the inputted higher control command as is to the internal motor control circuit part 31 as a driving control command. Then, the motor control circuit part 31 performs the power supply control to the motor 2 in accordance with the driving control command while referring to the driving state amount detected by the position detector 3 as a feedback signal, making it possible for the overall motor driving system 1 to stably drive the motor 2 in accordance with the higher control command of the controller 11. During normal operation, there is no detection signal output from either of the two sensors 15 and 16, and neither of the two corresponding safety request signals is outputted from the safety controller 12 (refer to the dashed lines in the figure).

Then, during such normal operation of the industrial machine S, when the passage doors 19 and/or 20 of the respective safety fences 17 and 18 shown in FIG. 2 are opened, at least the sensor A 15 and, depending on the case, sometimes the sensor B 16 output a detection signal. The safety controller 12 that receives this signal than regards the state as one in which the motor 2 of the industrial machine S should be decelerated and stopped and, as shown in FIG. 4 or FIG. 5, outputs the safety request signals corresponding to each of the detection signals to at least the safety module 14 and, depending on the case, the controller 11.

The motor controller 13 that decelerates and stops the motor 2 of the industrial machine S via the safety module 14 and, depending on the case, the controller 11 in which the safety request signals were thus inputted selects and executes either controller deceleration mode shown in FIG. 4 or active deceleration mode shown in FIG. 5. Note that the selection of a mode in the example of this embodiment may be made in advance by having the user select a mode via a setup operation using the engineering tool 22 shown in FIG. 1.

In the controller deceleration mode shown in FIG. 4, in a predetermined state in which the passage doors 19 and 20 of the safety fences 17 and 18 are opened, requiring deceleration and stopping of the motor 2, the controller 11 outputs a higher control command as is to the motor control circuit part 31 as a drive control command, i.e., performs deceleration control and stop control of the motor 2 in accordance with the higher control command from the controller 11. However, in such a case, the system requires a system configuration that inputs the safety request signals from the safety controller 12 to the controller 11 as well (that is, wiring for transmitting the safety request signals from the safety controller 12 to the controller 11, and a function that receives the safety request signals in the controller 11 itself), and further requires in the controller 11 itself a function capable of outputting a higher control command in accordance with the higher control operation pattern that satisfies safety standard criteria when the safety request signals are inputted.

Further, in the active deceleration mode shown in FIG. 5, only in a case of the predetermined state in which the passage doors 19 and 20 of the safety fences 17 and 18 are opened, requiring deceleration and stopping of the motor 2, an internal deceleration command that is in accordance with a self-control operation pattern that satisfies safety standard criteria is generated inside the motor controller 13 and inputted as a driving control command to the motor control circuit part 31. That is, the motor controller 13 itself rather than the controller 11 autonomously performs deceleration control and stop control of the motor 2. In such a case, a system configuration that inputs a safety request signal to the controller 11 is not required, and the controller 11 does not need to output the higher control command in accordance with a higher control operation pattern.

Note that the safety module 14 connected to the motor controller 13 is capable of directly outputting an HWBB startup signal to the above-described HWBB 32 so that the power supply to the motor 2 can be shut down in each of the operation pattern steps of both the higher control operation pattern of the above-described controller deceleration mode or the self-control operation pattern of the above-described active deceleration mode.

A comparing and monitoring part 41 is provided to the safety module 14 connected to the motor controller 13. This comparing and monitoring part 41 performs the function of comparing the driving state amount of the motor 2 with a predetermined operation monitoring pattern when a safety request signal is inputted from the safety controller 12, and outputting an HWBB startup signal to the HWBB 32 to shut down the power supply from the motor control circuit part 31 to the motor 2 when the driving state amount exceeds the operation monitoring pattern. Further, as described in detail later, depending on the type of the operation monitoring pattern applied (SBB or SBB-D described later), the operation monitoring pattern performs the function of independently outputting an HWBB startup signal to the HWBB 32 to shut down the power supply from the motor control circuit part 31 to the motor 2 based on predetermined timing after input of a safety request signal from the safety controller 12. Note that this comparing and monitoring part 41 is equivalent to the comparing and monitoring processing part described in the claims. Further, the comparing and monitoring part 41 is also equivalent to the comparing and monitoring processing means described in the claims.

Figure 6:
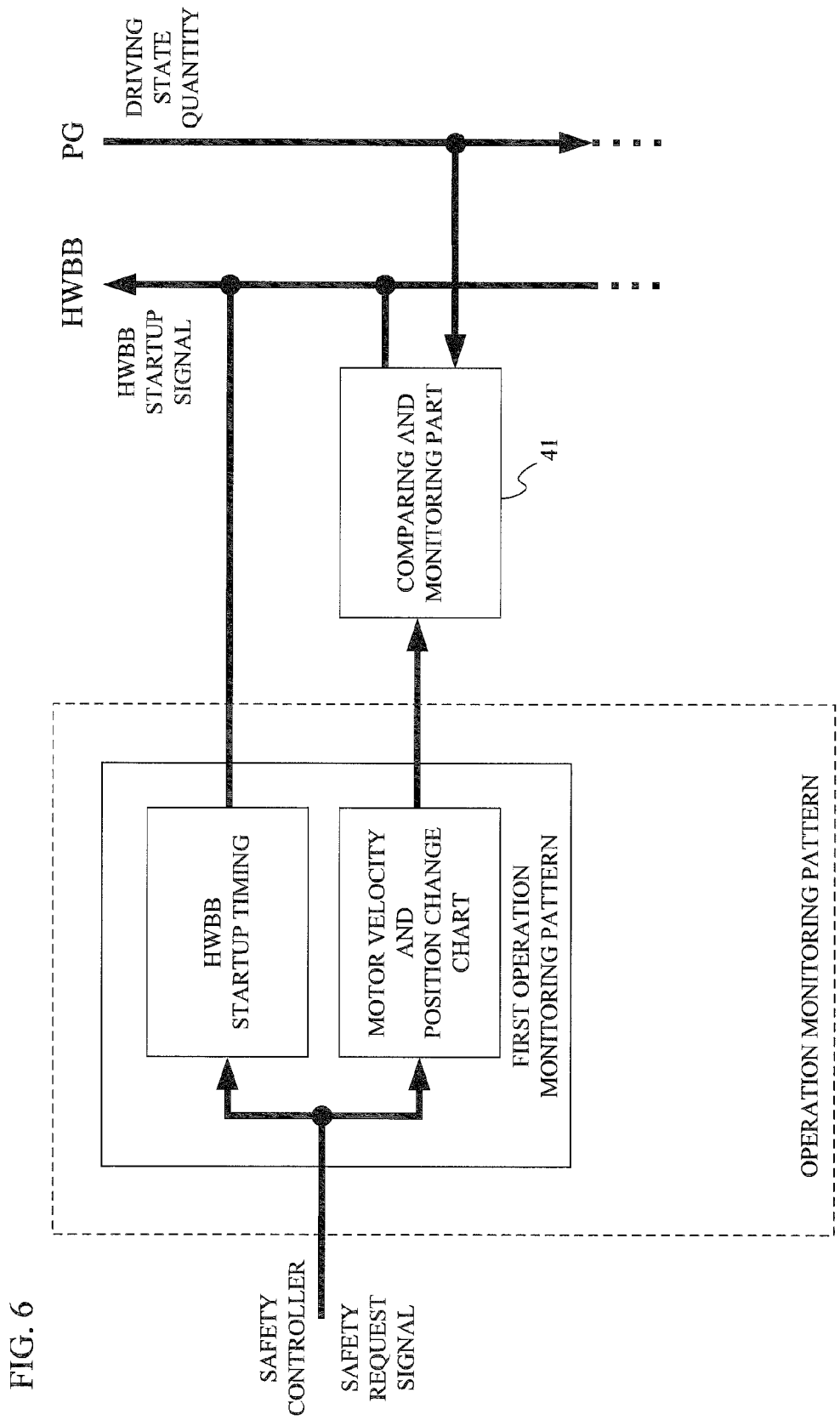
FIG. 6 is a diagram illustrating operation monitoring pattern details and the flow of peripheral signals of the comparing and monitoring part.

The details of the operation monitoring patterns processed by the safety module 14 will now be described with reference to FIG. 6. FIG. 6 is a diagram illustrating operation monitoring pattern details and the flow of peripheral signals of the comparing and monitoring part 41. Note that, in the figure, only the first operation monitoring pattern and the corresponding comparing and monitoring part 41 and signal flow are shown to avoid complexities of illustration.

In FIG. 6, the operation monitoring pattern processed by the safety module 14 includes at least one of two process elements: HWBB startup timing and motor velocity/position change chart. The HWBB startup timing process element performs the function of directly outputting an HWBB startup signal to the above-described HWBB 32 based on predetermined timing after input of a safety request signal from the safety controller 12. Further, the process element of the motor velocity/position change chart performs the function of outputting to the comparing and monitoring part 41 a model value of the velocity of the motor 2 that changes or is steadily maintained in a predetermined process, or a model value of the relative position of the motor 2 that is steadily maintained from a predetermined timing, when a safety request signal is inputted from the safety controller 12. The value compared with the driving state amount of the motor 2 by the above-described comparing and processing part 41 is the model value outputted by this motor velocity/position change chart.

Depending on the type of pattern applied by the first operation monitoring pattern, either one or both of the above-described two process elements are included in the first operation monitoring pattern. When both of the two process elements are included as shown in the figure, the respective safety request signals are simultaneously inputted from the safety controller 12, making it possible to individually perform processing while executing the respective processes in parallel. Although not particularly shown in the figure, only the above-described motor velocity/position change chart process element and not the HWBB startup timing process element is included in the higher control operation pattern and the self-control operation pattern respectively processed by the controller 11 and the motor controller 13. That is, in the controller deceleration mode shown in FIG. 4, the model value outputted by the motor velocity/position change chart within the higher control operation pattern is outputted as is from the controller 11 as the higher control command. Further, in the active deceleration mode shown in FIG. 5, the model value outputted by the motor velocity/position change chart within the self-control operation pattern is generated as the internal deceleration command as is.

With this arrangement, when an operation state in which the driving state amount of the actual motor 2 exceeds the operation monitoring pattern (specifically, the model value output by the motor velocity/position change chart) occurs, causing deviation from safety standards, the comparing and monitoring part 41 can shut down the power supply to the motor 2 via the HWBB 32 and reliably and quickly decelerate and stop the motor 2. Note that deceleration and stopping in this case is performed by connecting resistors between the terminals of the motor 2 and executing deceleration and damped stopping via a dynamic brake that achieves a braking torque, or executing deceleration and stopping via an inertia operation, as described in detail later.

Further, in this embodiment, the controller 11, the motor controller 13, and the comparing and monitoring part 41 of the safety module 14 are each capable of processing the four types (controller deceleration mode: SBB, SBB-D, SPM-D, SLS-D; refer to FIG. 8 to FIG. 12 described later) of higher control operation patterns or operation monitoring patterns described later. Furthermore, the motor controller 13 and the comparing and monitoring part 41 of the safety module 14 are each capable of processing the self-control operation patterns and operation monitoring patterns described later (active deceleration mode; refer to FIG. 14 and FIG. 15 described later).

Furthermore, as described above, the safety controller 12 is designed to individually output two safety request signals, and the controller 11, the motor controller 13, and the comparing and monitoring part 41 of the safety module 14 are each capable of supporting and applying the same or different types of operation patterns (a first operation pattern, second operation pattern, first operation monitoring pattern, and second operation monitoring pattern in the figure) to the two safety request signals and individually processing in parallel the applied first and second operation patterns. These first and second operation patterns may be set in advance to operation patterns to be applied via a user setup operation performed using the engineering tool 22 shown in the above FIG. 1, and may be set to the same type or to different types. Further, the various timings and parameters such as driving velocity and driving position within the operation patterns can be suitably set using the above-described engineering tool 22 for the higher control operation pattern, the self-control operation pattern, and the operation monitoring pattern, even if the patterns are for the first operation pattern (or the second operation pattern) corresponding to the same safety request signal.

Note that the above-described controller deceleration mode is equivalent to the first safety function mode, and the active deceleration mode is equivalent to the second safety function mode described in the claims. Further, the overall function section related to the selection and execution of the controller deceleration mode shown in FIG. 4 and the active deceleration mode shown in FIG. 5 inside the motor controller 13 is equivalent to the mode selecting and executing part described in the claims. Further, the overall function section related to the selection and execution of the controller deceleration mode shown in FIG. 4 and the active deceleration mode shown in FIG. 5 inside the motor controller 13 is also equivalent to the mode selecting and executing means described in the claims.

Then, the controller 11, the motor controller 13, and the comparing and monitoring part 41 of the safety module 14 individually process in parallel the first operation pattern and the second operation pattern respectively corresponding to the safety request signals during the period in which the two safety request signals are inputted in an overlapping manner, and eventually the result of the combination thereof is either generated as a higher control command or an internal deceleration command or subjected to comparing and monitoring.

Figure 7:
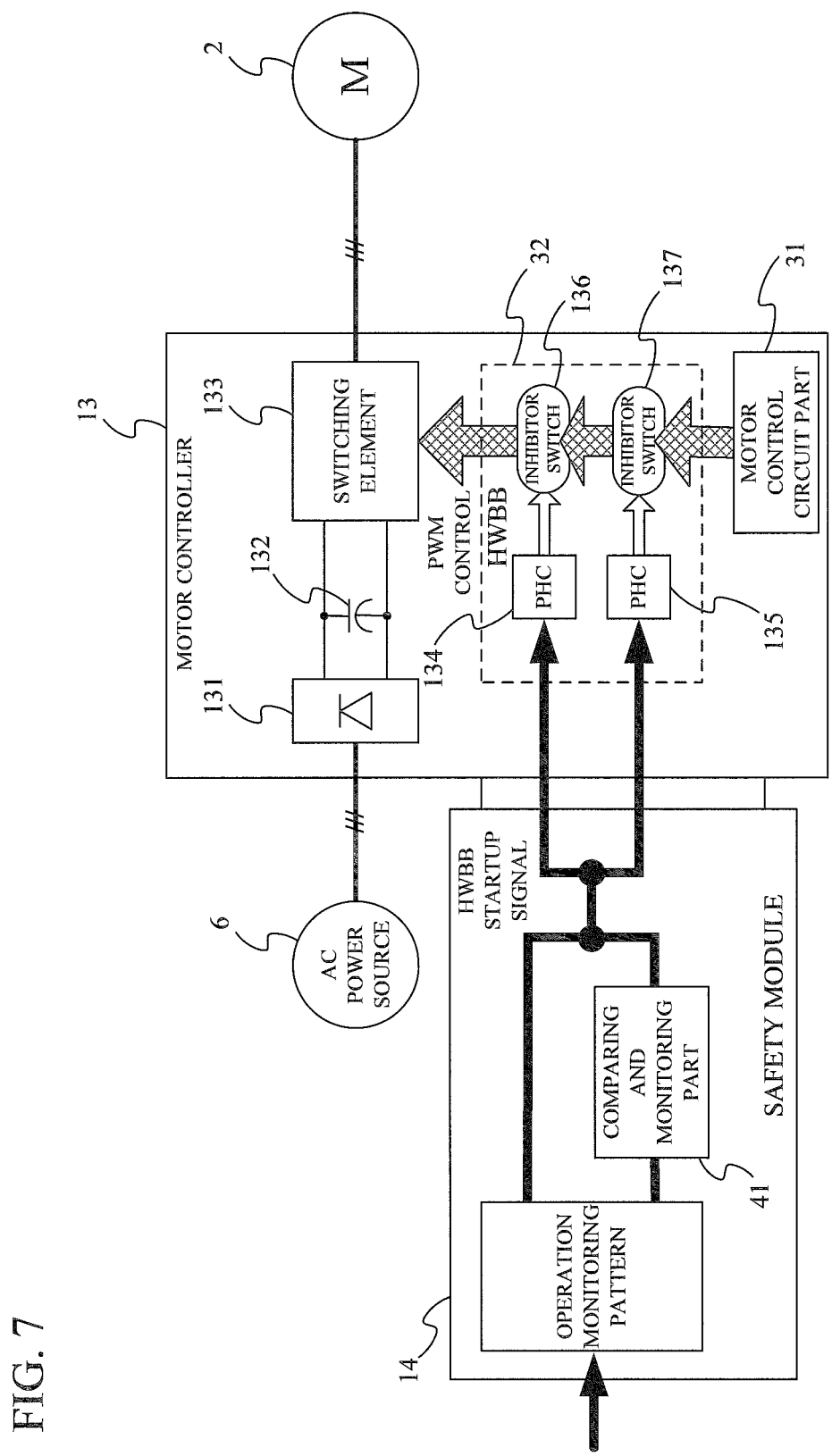
FIG. 7 is a function block diagram showing the detailed configuration of HWBB.

FIG. 7 is a function block diagram showing the detailed configuration of the HWBB 32. Note that, in FIG. 7, only the components related to the HWBB 32 are shown; all other remotely related components have been omitted.

In FIG. 7, the motor controller 13 comprises a rectifier 131, a smoother 132, a switching element 133, two inhibitor switches 136 and 137, and two photocouplers 134 and 135 (not shown in FIG. 1 or FIG. 3 to FIG. 6) in addition to the motor control circuit part 31.

The rectifier 131 is made of a diode bridge, for example, and performs the function of converting (rectifying) the AC voltage of an external AC power source 6 to DC voltage.

The smoother 132 comprises a condenser, for example, and performs the function of smoothing the DC voltage converted (rectified) by the above-described rectifier 131.

The switching element 133 comprises a bridge of six IGBT elements, for example, and is subjected to PWM control by a PWM control signal (ON/OFF signal) from the above-described motor control circuit part 31, and outputs three-phase AC power to the motor 2. The above-described motor control circuit part 31 performs the power supply control to the motor 2 via the PWM control of this switching element 133.

The two inhibitor switches 136 and 137 are serially connected to wiring that transmits the PWM control signal from the aforementioned motor control circuit part 31 to the switching element 133, and perform the function of switching between conduction and shutdown of the PWM control signal.

The two photocouplers 134 and 135 perform the function of transmitting an ON/OFF signal via optical means, and output a signal for shutting down the PWM control signal to the corresponding inhibitor switches 136 and 137 when an HWBB startup signal is inputted thereto.

The HWBB 32 comprises the above-described two inhibitor switches 136 and 137 and the above-described two photocouplers 134 and 135 and, when an HWBB startup signal is inputted from each component to this HWBB 32, shuts down transmission of the PWM control signal from the motor control circuit part 31 to the switching element 133, i.e., shuts down power supply control to the motor 2 via the motor control circuit part 31 (shuts down the power supply from the switching element 133 to the motor 2). Then, with use of the aforementioned photocouplers 134 and 135, it is possible to safely switch between conduction and shutdown of the PWM control signal of the HWBB 32 while maintaining electrical isolation between the respective CPU control systems and the above-described PWM control systems of the controller 11, the motor controller 13, and the safety module 14.

Further, while not particularly shown in FIG. 4 to FIG. 6, the wiring that transmits the HWBB startup signal is divided into two with each respectively executing the switching of the two inhibitor switches 136 and 137 serially connected via the photocouplers 134 and 135. As a result, in the event one of the inhibitor switches or photocouplers does not switch to a shutdown state due to chance failure, shutdown can be executed by the other inhibitor switch. That is, in the event of chance failure of one of the inhibitor switches 136 or 137 or one of the photocouplers 134 or 135, shutdown of the PWM control signal can be reliably performed.

The above-described four operation patterns applied by each component of this embodiment will now be described. Note that while a large number of operation patterns has been disclosed in the International Standard IEC 61800-5-2, the four types of operation patterns including the safety base block function (hereinafter SSB), the safety base block function with delay (hereinafter SSB-D), the safe position monitoring function with delay (hereinafter SPM-D), and the safety limit speed monitoring function with delay (hereinafter SLS-D) described below (each name is a common name in this embodiment) are applied in this embodiment. The following will also consecutively describe these four operation patterns in detail based on a case where the motor controller 13 executes the above-described controller deceleration mode.

Figure 8:
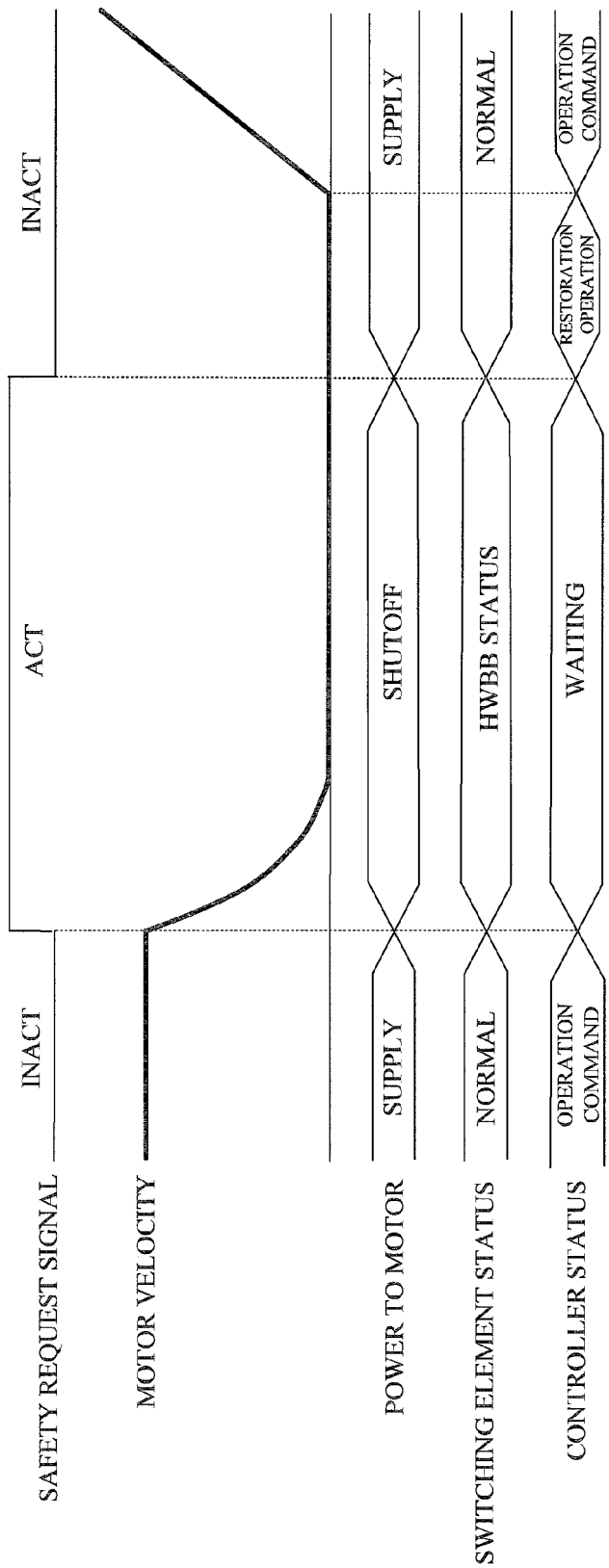
FIG. 8 is a diagram showing a time chart of the operation pattern of SBB executed in controller deceleration mode.

First, FIG. 8 is a diagram showing a time chart of the operation pattern of SBB executed in controller deceleration mode. Note that the operation monitoring pattern of the safety module 14 that applies this SBB operation pattern includes only the HWBB startup timing process element shown in FIG. 6.

In FIG. 8, first, during normal operation, the safety request signal maintains a low-level "INACT" state and the motor 2 is driven at a predetermined motor velocity. During this period, power is supplied from the switching element 133 shown in FIG. 7 to the motor 2, the switching element 133 of the motor controller 13 is normally in a PWM controlled state, and the controller 11 is in a state of outputting a normal operation command as the higher control command.

Then, the safety controller 12 detects a state that puts the operator at risk, such as the opening of the above-described passage doors 19 and 20, via the sensors 15 and 16 and, when the safety request signal switches to the high-level "ACT" state, the safety module 14 that receives this signal (specifically, the HWBB startup timing process element within the operation monitoring pattern) immediately outputs an HWBB startup signal to the HWBB 32. As a result, the inhibitor switch of the HWBB 32 shuts down the PWM control signal to change the state to an HWBB state, and the switching element 133 shuts down the power supply to the motor 2. The motor velocity then rapidly decreases and comes to a complete stop. At this time, when the motor 2 comes to a complete stop, the motor 2 is subjected to deceleration and damped stopping by a dynamic brake achieved by connecting resistors between the terminals of the motor 2 and executing a braking torque, or is subjected to deceleration and stopping by an inertia operation. Note that, when this SSB operation pattern is executed, the comparing and monitoring part 41 of the safety module 14 does not perform monitoring. Further, to ensure complete elimination of the torque of the motor 2 as well when the motor 2 is stopped, measures may be taken when the motor 2 of the industrial machine S drives members in the vertical direction, such as installation of a suitable mechanical brake to prevent such members from falling.

Subsequently, when the state that puts the operator at risk is cleared by the closing of the above-described passage doors 19 and 20, for example, the safety controller 12 returns the safety request signal to the low-level "INACT" state, and the controller 11 that receives this signal once again outputs a normal operation command to the motor controller 13 via a restoration operation. After this restoration operation, the HWBB startup signal is cleared, the switching element 133 is subjected to normal PWM control, and power is supplied to the motor 2.

The operation pattern of SBB that executes such a time chart achieves a so-called safety base block function (SBB) corresponding to "Safe Torque Off (STO)" defined in the International Standard IEC 61800-5-2. This SBB operation pattern immediately starts the HWBB 32 when a state that puts the operator at risk is detected, making it possible to shut down the power supply to the motor 2 and quickly and reliably decelerate and stop the motor 2.

According to such an SBB operation pattern, when the motor 2 comes to a complete stop, the motor 2 is subjected to deceleration and damped stopping via a dynamic brake or to deceleration and stopping by an inertia operation. As a result, the motor 2 cannot be stopped within a preferred time period or decelerated at a preferred deceleration rate, for example. In response, there exists the SBB-D operation pattern which decelerates and stops the motor 2 at a certain deceleration rate by a specified time in an initial stage, and then starts the HWBB 32.

Figure 9:
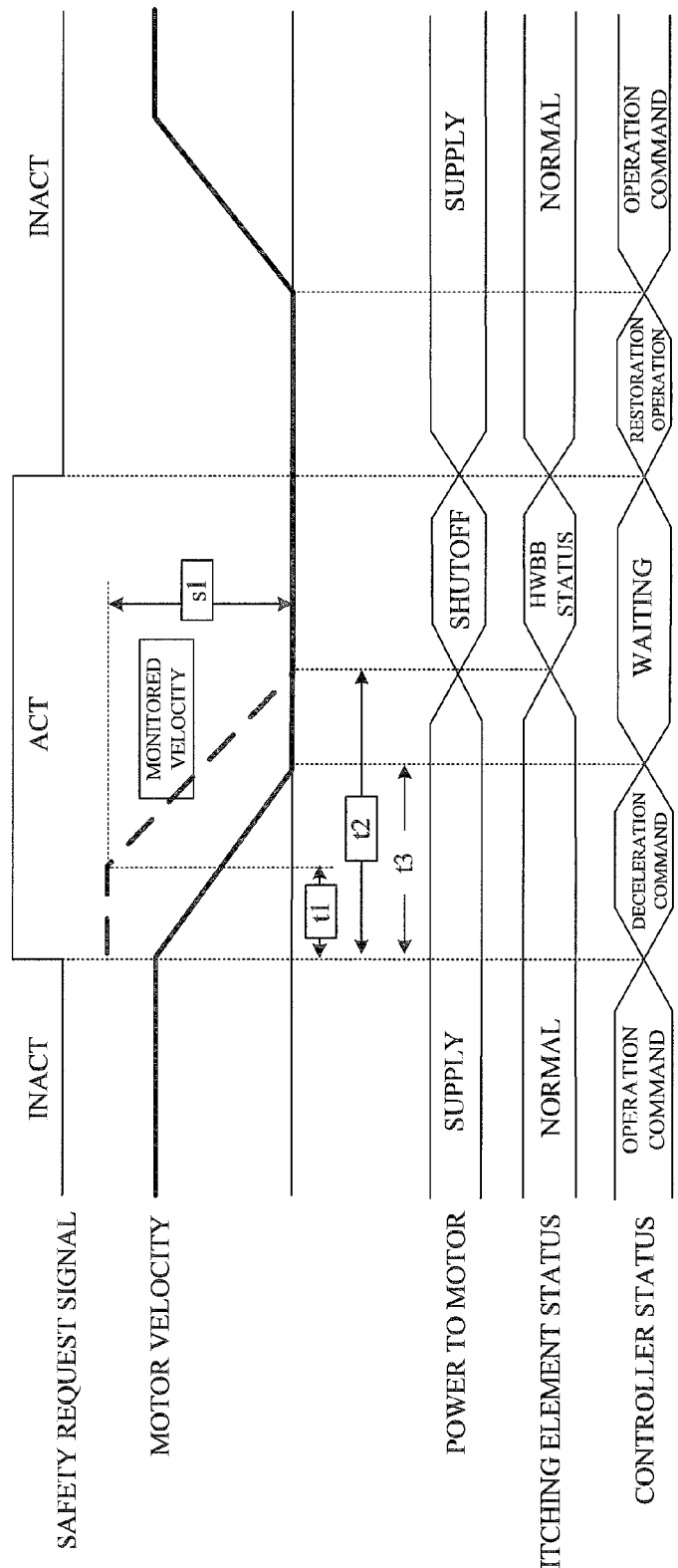
FIG. 9 is a diagram showing a time chart of the operation pattern of SBB-D executed in controller deceleration mode.

FIG. 9 is a diagram showing a time chart of the operation pattern of SBB-D executed in controller deceleration mode. Note that the operation monitoring pattern of the safety module 14 that applies this SBB-D operation pattern includes both the HWBB startup timing process element and the motor velocity/position change chart process element shown in FIG. 6.

In FIG. 9, when the safety request signal switches from the low-level "INACT" state to the high-level "ACT" state, the controller 11 that receives this signal (specifically, the motor velocity/position change chart process element within the higher control operation pattern) immediately outputs a deceleration command for decelerating the motor 2 at a predetermined deceleration rate to the motor control circuit part 31 of the motor controller 13 as a higher control command. Then, when deceleration of the motor velocity proceeds to a stop, the controller 11 stops the output of the operation command to the motor control circuit part 31 and changes to a waiting state. At this time, a specified time t3 from the start to the stop of deceleration of the motor velocity is a parameter set by the user in advance for the higher control operation pattern (specifically, the motor velocity/position change chart process element) on the controller 11 side, and the deceleration rate is calculated so that deceleration to zero is performed during this specified time t3, regardless of the motor velocity during normal operation.

Then, in this controller deceleration mode, when the controller 11 outputs a higher control command (deceleration command) in accordance with the higher control operation pattern, the motor velocity sometimes does not adhere to this higher control command (deceleration command). The cause of such failure is presumably an error in or failure of the motor 2 or the position detector 3, some type of action received from the load side connected to the motor 2 that is unrelated to the higher control command (deceleration command), or the like. In response, in this embodiment, when the same safety request signal is inputted to the safety module 14, the comparing and monitoring part 41 processes the operation monitoring pattern (specifically, the model value output by the motor velocity/position change chart process element) set in parameters by the user in advance, and compares and monitors this pattern with the actual motor velocity based on a driving state amount detected by the position detector 3. Then, although not particularly shown, when the motor velocity exceeds the monitored velocity of the operation monitoring pattern, the safety of the operator H who has passed through the above-described passage doors 19 and 20 is given top priority even during deceleration control by the controller 11, and the comparing and monitoring part 41 immediately outputs an HWBB startup signal to shut down the power supply to and forcibly stop the motor 2.

The operation monitoring pattern (specifically, the motor velocity/position change chart process element) of the safety module 14 at this time is a pattern set in parameters by the user in advance. Specifically, the monitored velocity in the initial stage may be set in the higher control command (deceleration command) in such a manner that slows the maximum velocity s1 of the motor 2, a timing t1 at which deceleration of the monitored velocity is started, and a timing t2 at which deceleration of the monitored velocity is ended to the extent possible based on safety standards. The parameter values including the maximum velocity s1, the deceleration start timing t1, and the deceleration end timing t2 of the monitor velocity are values that should be set taking into consideration the design of the industrial machine S, and can be arbitrarily set by the user using the engineering tool 22.

Then, after the safety request signal switches to an "ACT" state and the process proceeds to the deceleration end timing t2 at which the monitored velocity is zero, the HWBB startup signal is outputted in accordance with the operation monitoring pattern (specifically, the HWBB startup timing process element) to shut down the power supply to the motor 2 and change the state to an HWBB state. Subsequently, when the safety controller 12 changes the safety request signal back to the low-level "INACT" state, the motor 2 resumes normal operation via the same restoration operation as that in the SBB operation pattern of FIG. 8.

The operation pattern of SBB-D that executes such a time chart achieves a so-called safety base block function with delay (SBB-D) corresponding to "Safe Stop 1 (SS1)" defined in the International Standard IEC 61800-5-2. According to this SBB-D operation pattern, even though the HWBB 32 is eventually started and the power supply to the motor 2 is eventually shut down in response to a state that puts the operator at risk, the motor 2 is first actively decelerated at a certain deceleration rate by a specified time, making it possible to differentiate use of SBB-D and SBB in accordance with the safety requirements of the system. Note that the deceleration rate is not limited to a constant rate, allowing change over time taking into consideration the reduction of the load to the load machine 4.

According to the above SBB and SB-D, since the HWBB 32 is thus started to shut down the power supply to the motor 2, the driving position or velocity of the motor 2 cannot be maintained. In response, there exist an SPM-D operation pattern for maintaining the driving position of the motor 2 after deceleration by the specified time, and an SLS-D operation pattern for maintaining a relatively low velocity of the motor 2 after deceleration by the specified time.

Figure 10:
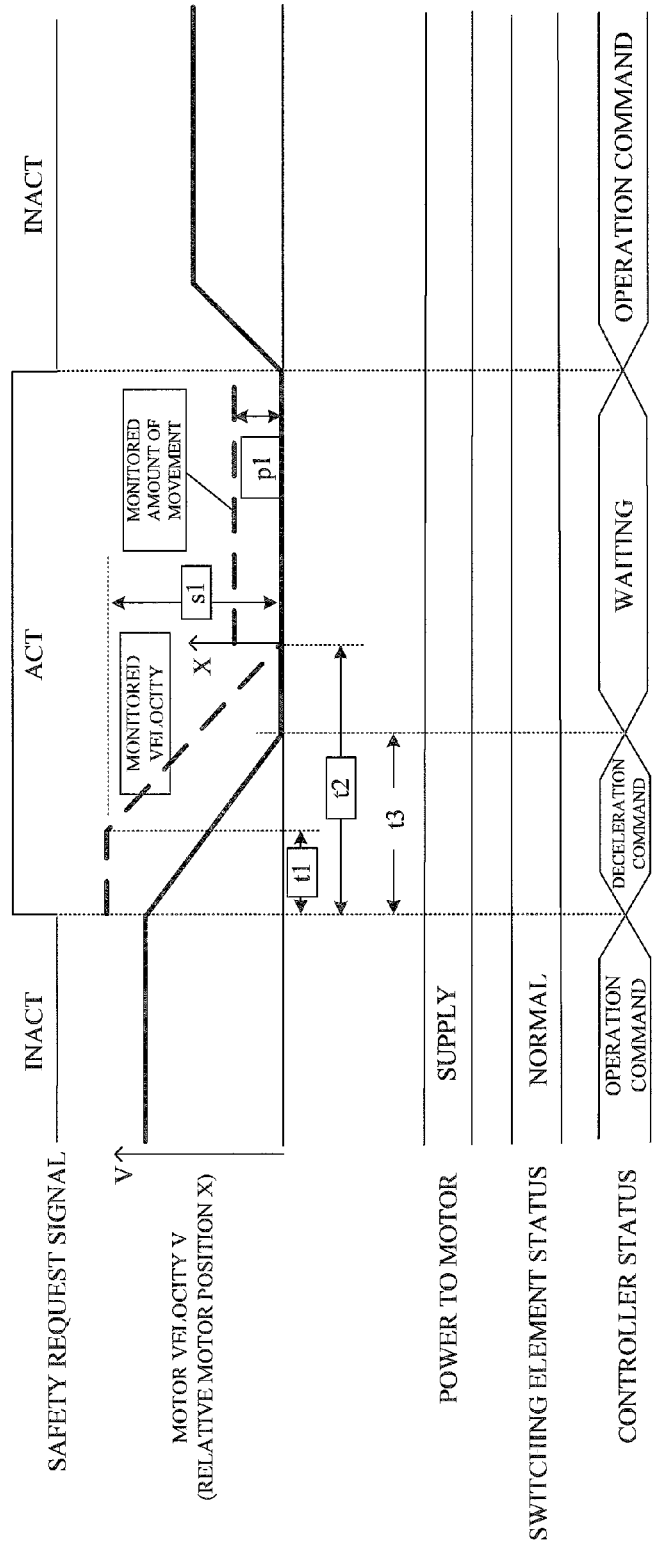
FIG. 10 is a diagram showing a time chart of the operation pattern of SPM-D executed in controller deceleration mode.

FIG. 10 is a diagram showing a time chart of the operation pattern of SPM-D executed in controller deceleration mode. Note that the operation monitoring pattern of the safety module 14 that applies this SPM-D operation pattern includes only the motor velocity/position change chart process element shown in FIG. 6.

In FIG. 10, when the safety request signal switches from the low-level "INACT" state to the high-level "ACT" state, the controller 11 outputs a deceleration command for decelerating and stopping the motor 2 by the specified time t3, similar to the case of SBB-D of FIG. 9. Then, when the motor velocity is stopped upon arrival of the specified time t3, the controller 11 (specifically, the motor velocity/position change chart process element within the higher control operation pattern) provides instructions to the motor control circuit part 31 so that the driving position of the motor 2 is maintained, stops output of the operation command to the motor control circuit part 31, and then changes to a waiting state.

Further, the comparing and monitoring part 41 of the safety module 14, similar to the case of SBB-D of FIG. 9, monitors the actual motor velocity using the monitored velocity set as the maximum velocity s1 in the initial stage, subsequently monitors the monitored velocity at which deceleration is started at the deceleration start timing t1, and ends deceleration of the monitored velocity at the deceleration end timing t2. Subsequently, the comparing and monitoring part 41 monitors whether or not the actual motor driving position (the driving state amount detected by the position detector 3) relatively exceeded a predetermined monitored movement amount p1. The operation monitoring pattern (specifically, the motor velocity/position change chart process element) of the safety module 14 thus combines the monitored velocity pattern up to the deceleration end timing t2 and the subsequent monitored movement amount p1. This monitored movement amount p1 is also a parameter value that should be set taking into consideration the design of the industrial machine S, and can be arbitrarily set by the user using the engineering tool 22.

The operation pattern of SPM-D that executes such a time chart achieves a so-called safe position monitoring function with delay (SPM-D) corresponding to "Safe Stop 2 (SS2)" defined in the International Standard IEC 61800-5-2. According to this SPM-D operation pattern, as long as the actual velocity and driving position of the motor 2 do not exceed the operation monitoring pattern, the HWBB 32 does not start, and thus the switching element 133 of the motor controller 13 maintains normal PWM control, and power is continuously supplied to the motor 2, even if the safety request signal is in an "ACT" state. Thus, when the safety request signal returns to the low-level "INACT" state, an operation command can be immediately output to restore operation to normal without passing through the restoration operation via the controller 11. Further, since the HWBB 32 is not started, it is possible to differentiate use from the above-described SBB and SBB-D in accordance with the safety requirements of the system.

In the above SPM-D, when the actual motor velocity or motor position exceeds the monitored velocity or monitored movement amount p1 of the operation monitoring pattern, the comparing and monitoring part 41 immediately outputs an HWBB start signal and shuts down power supply to and forcibly stops the motor 2.

Figure 11:
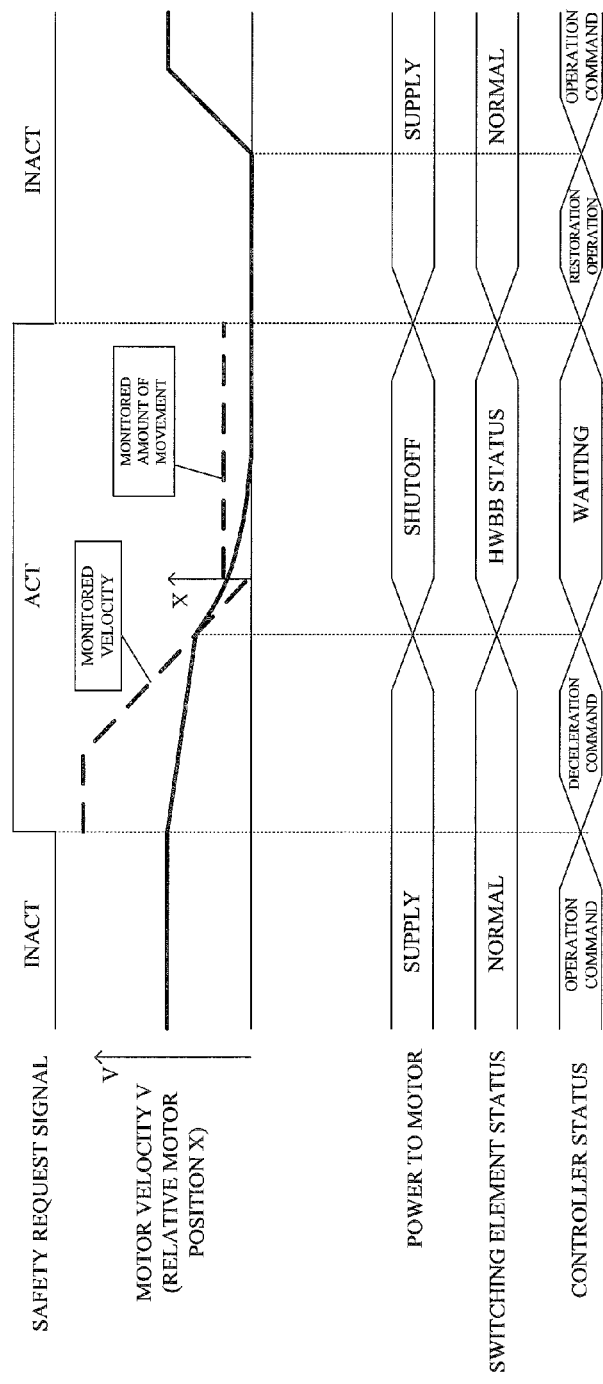
FIG. 11 is a diagram showing another time chart of the operation pattern of SPM-D executed in controller deceleration mode.

FIG. 11 is a diagram showing another time chart of the operation pattern of SPM-D executed in controller deceleration mode.

In FIG. 11, when the safety request signal switches from the low-level "INACT" state to the high-level "ACT" state, the controller 11 outputs a deceleration command for decelerating and stopping the motor 2 by the specified time t3, as shown in FIG. 10. Nevertheless, when the actual motor velocity exceeds the monitored velocity of the operation monitoring pattern during this deceleration, the comparing and monitoring part 41 immediately outputs the HWBB startup signal and shuts down the power supply to and forcibly stops the motor 2, even if during deceleration control by the controller 11.

Figure 12:
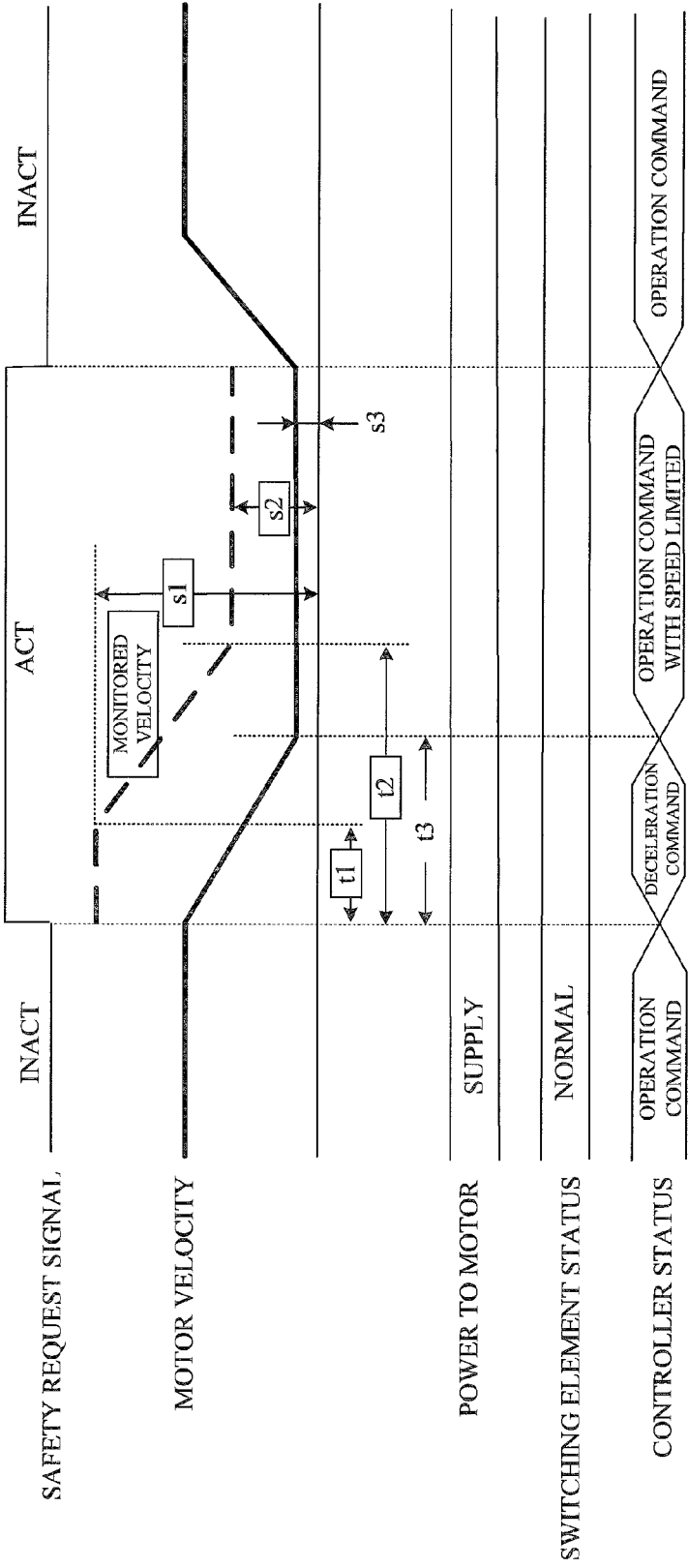
FIG. 12 is a diagram showing a time chart of the operation pattern of SLS-D executed in controller deceleration mode.

FIG. 12 is a diagram showing a time chart of the operation pattern of SLS-D executed in controller deceleration mode. Note that the operation monitoring pattern of the safety module 14 that applies this SLS-D operation pattern includes only the motor velocity/position change chart process element shown in FIG. 6.

In FIG. 12, when the safety request signal switches from the low-level "INACT" state to the high-level "ACT" state, the controller 11 outputs a deceleration command for decelerating and stopping the motor 2 by the specified time t3 in the same manner as SBB-D and SPM-D of FIG. 9 and FIG. 10. However, in the case of SLS-D, the motor 2 does not need to be completely stopped at the moment of the specified time t3, but rather may be decelerated to a relatively low limited speed s3. Then, upon arrival of the specified time t3, the controller 11 (specifically, the motor velocity/position change chart process element within the higher control operation pattern) outputs an operation command with a speed limitation to the motor control circuit part 31 to maintain the motor velocity at the limited speed s3.

Further, the comparing and monitoring part 41 of the safety module 14, similar to the case of SBB-D and SPM-D of FIG. 9 and FIG. 10, monitors the actual motor velocity at the monitored velocity set as the maximum speed s1 in the initial stage, subsequently monitors the monitored velocity at which deceleration is started at the deceleration start timing t1, and ends deceleration of the monitored velocity at the deceleration end timing t2. Subsequently, the comparing and monitoring part 41 monitors whether or not the actual motor velocity has exceeded a relatively low monitored velocity s2. When the actual motor velocity exceeds the monitored velocity s2, similar to the case of FIG. 11, the comparing and monitoring part 41 immediately outputs an HWBB startup signal and shuts down the power supply to and forcibly stops the motor 2. This monitored velocity s2 that is set to a relatively low value is also a parameter value that should be set taking into consideration the design of the industrial machine S and the safety of the operator H, and can be arbitrarily set by the user using the engineering tool 22.

The operation pattern of SLS-D that executes such a time chart achieves a so-called safety limit speed monitoring function with delay (SLS-D) corresponding to "Safety limit Speed (SLS)" defined in the International Standard IEC 61800-5-2. In this SLS-D operation pattern as well, as long as the actual velocity of the motor 2 does not exceed the operation monitoring pattern, the HWBB 32 is not started, and thus the motor controller 13 maintains a normal control state, and power is continuously supplied to the motor 2. Thus, the controller 11 can immediately restore normal operation without passing through the restoration operation. Further, since the motor velocity is not completely stopped, it is possible to differentiate use from SBB, SBB-D, and SPM-D described above in accordance with the safety requirements of the system.

Then, in this embodiment, as described above, the safety controller 12 is capable of outputting two independent safety request signals, and the controller 11, the motor controller 13, and the safety module 14 can selectively apply any of the four above-described types of operation patterns to each of the safety request signals. In other words, the higher control operation pattern and the operation monitoring pattern can be executed in parallel on two systems for the same safety request signal. In this embodiment, when the inputs of two safety request signals overlap and two respectively corresponding operation patterns are simultaneously executed in parallel, the operation pattern that will most safely reduce the velocity of the motor 2 is applied with priority regardless of the start sequence, in either the higher control operation pattern of the controller 11 or the operation monitoring pattern of the safety module 14.

Figure 13:
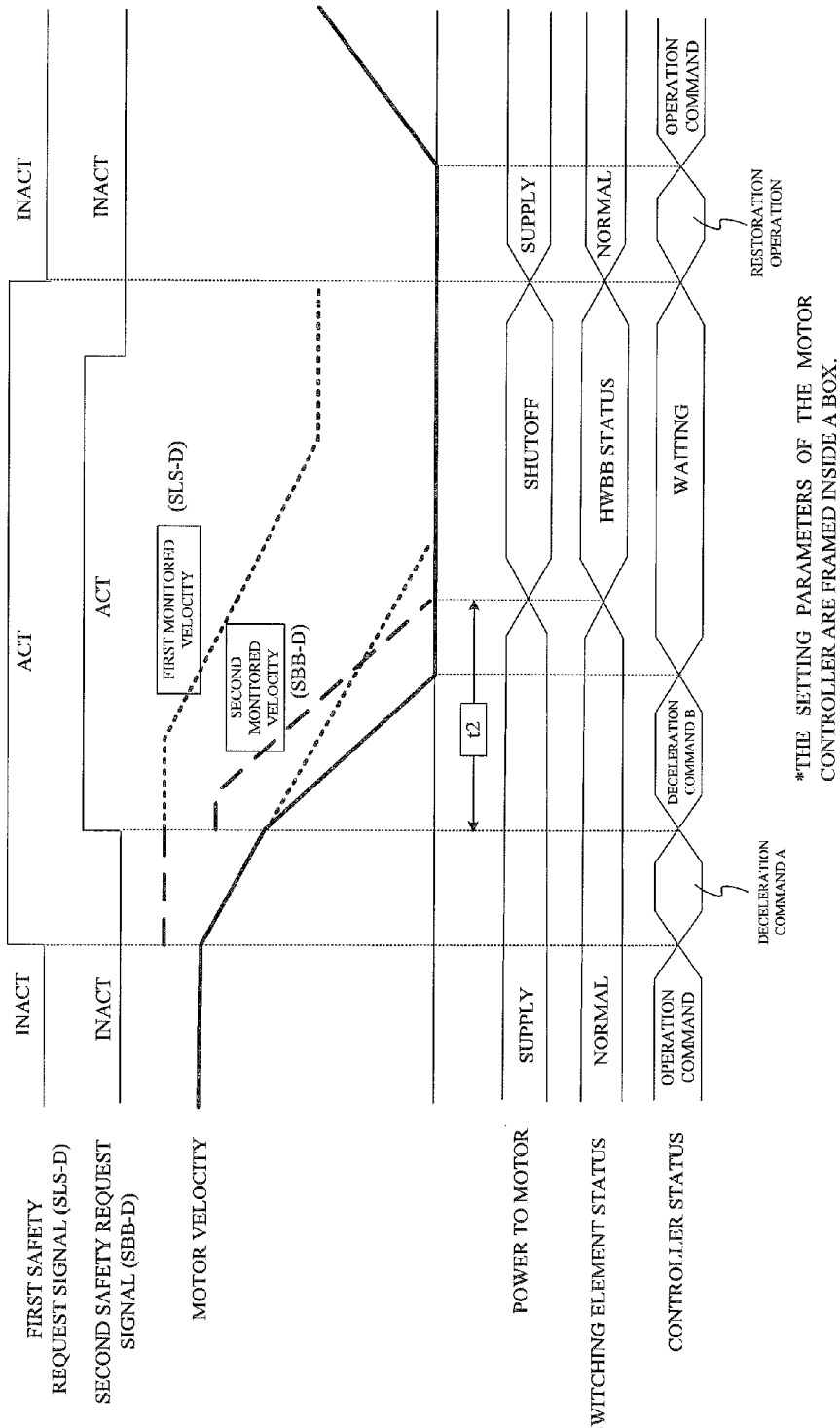
FIG. 13 is a diagram showing a time chart in a case where the SLS-D operation pattern and SBB-D operation pattern are integrally applied in controller deceleration mode.

FIG. 13 shows a time chart of a case where the SLS-D operation pattern is applied to the first operation pattern corresponding to the first safety request signal, and the SBB-D operation pattern is applied to the second operation pattern corresponding to the second safety request signal in controller deceleration mode.

In the example shown in FIG. 13, during the period in which only the first safety request signal is first switched to the "ACT" state, the controller 11 immediately outputs deceleration command A in accordance with the first operation pattern (higher control operation pattern) of SLS-D to decelerate the motor 2, and the safety module 14 starts deceleration of the first monitored velocity at a predetermined deceleration start timing in accordance with the first operation monitoring pattern (operation monitoring pattern).

However, as in the example illustrated, when the second safety request signal switches to an "ACT" state before the safety module 14 ends the deceleration and stopping of the monitored velocity of SLS-D described above, the controller 11 starts execution of the second operation pattern of SBB-D in parallel with the first operation pattern of SLS-D. In this example, the second operation pattern is set to a higher motor velocity deceleration rate than the first operation pattern, and thus in this embodiment the second operation pattern is applied with priority over the first operation pattern as described above. That is, the controller 11 outputs to the motor controller 13 deceleration command B corresponding to the second operation pattern in place of the previously output deceleration command A corresponding to the first operation pattern, and thus the safety module 14 monitors the actual motor velocity based on the second monitored velocity that is in accordance with the second operation pattern in place of the first monitored velocity that is in accordance with the first operation pattern.

Then, according to the second operation pattern of SBB-D that is applied with priority, upon arrival of the deceleration end timing t2 set in advance in SBB-D and deceleration of the second monitored velocity of the safety module 14 to zero, the safety module 14 forcibly starts the HWBB 32 to shut down the power supply to the motor 2. When the HWBB 32 is thus started and the two safety request signals both subsequently switch to the "INACT" state, normal operation is resumed after passing through the restoration operation of the controller 11.

Note that while the examples shown in FIG. 13 represent a case where different types of operation patterns are applied to the two safety request signals, the aspect of the present invention is not limited thereto, allowing application of the same type of operation pattern. In such a case, it is possible to differentiate deceleration and stop control in accordance with the contents of each of the states that put the operator at risk and are detected by the respective sensors 15 and 16 by making the respective parameter values different even if the operation pattern type is the same.

While the above has been described in association with an illustrative scenario in which the motor controller 13 selects controller deceleration mode and executes deceleration and stop control of the motor 2, the following describes a case in which the motor controller 13 executes active deceleration mode. Note that the higher control command of the controller 11 is available in the two forms of a position command and a velocity command as previously described, and differences exist in the active deceleration mode process depending on which form of the higher control command is used by the motor control circuit part 31. The following consecutively describes the processing for each of these forms of the higher control command. Note that, regardless of which form of the higher control command is used to execute active deceleration mode, the self-control operation pattern of the motor controller 13 includes only the motor velocity/position change chart process element shown in FIG. 6. Further, in active deceleration mode as well, the monitoring function of the safety module 14 functions the same as in the above-described controller deceleration mode, and illustrations and descriptions thereof will be omitted.

Figure 14:
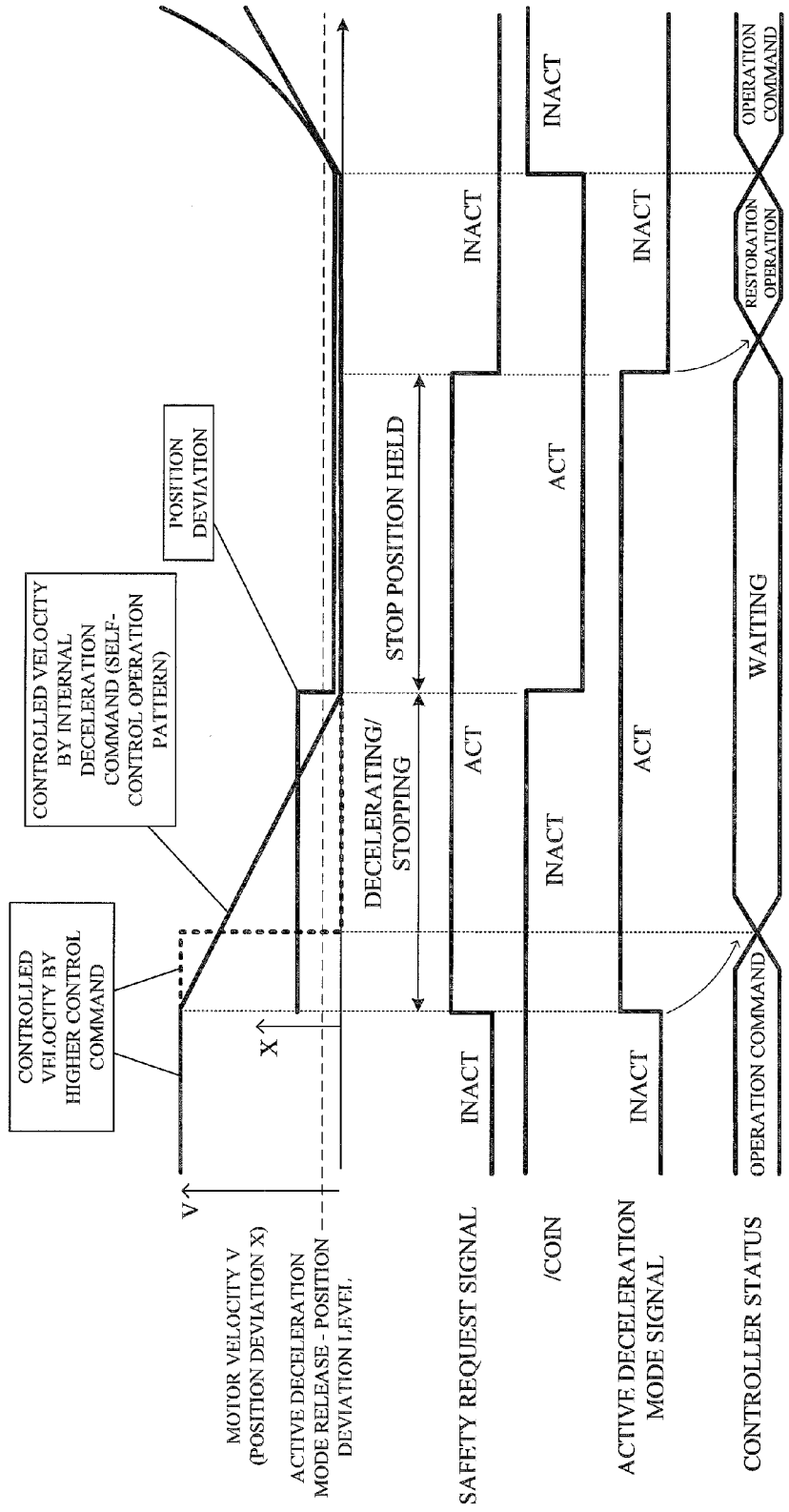
FIG. 14 is a diagram showing a time chart of the self-control operation pattern executed in active deceleration mode in a position command form.

FIG. 14 is a diagram showing a time chart of the self-control operation pattern executed in active deceleration mode in a position command form.

In FIG. 14, first, during normal operation, the safety request signal maintains a low-level "INACT" state and the motor 2 is driven at a predetermined motor velocity. During this period, the controller 11 outputs a target driving position of the motor 2 as a higher control command, and the motor control circuit part 31 in which this command is inputted calculates the driving velocity and driving torque of the motor 2 and performs the power supply control to the motor 2 so that the driving position of the motor 2 adheres to the target driving position. Further, during normal operation that is in accordance with the higher control command from the controller 11, a /COIN signal (described later) serving as an internal signal of the motor controller 13 continues to maintain a low-level "INACT" state.

Then, when the safety controller 12 detects a state that puts the operator at risk, such as the opening of the above-described passage doors 19 and 20, via the sensors 15 and 16, and switches the safety request signal to the high-level "ACT" state, the motor controller 13 immediately starts deceleration and stop control in active deceleration mode in place of motor control in accordance with the higher control command from the controller 11 that was in process up to that time. That is, the motor controller 13 controls the deceleration and stopping of the motor 2 by the internal deceleration command based on the self-control operation pattern formed by the parameters set in advance by the user. Although not shown, the above-described self-control operation pattern (specifically the motor velocity/position change chart process element) is determined by parameters including deceleration rate, stop speed, and stop continuation time.

At this time, the motor controller 13 outputs an internal deceleration command in the form of a position command based on the above parameters to the motor control circuit part 31. The difference between the target position of the inputted internal deceleration command and the actual motor position (driving state amount detected by the position detector 3) is the motor control position deviation, and the above-described /COIN signal is a signal indicating whether or not this position deviation falls within predetermined values of the parameters set by the user in advance, i.e., whether or not the actual motor position substantially matches the target position of the internal deceleration command. As soon as the motor controller 13 starts deceleration and stop control in active deceleration mode, this /COIN signal is in a high-level "INACT" state indicating that the position deviation has not yet fallen within the above-described predetermined values.

On the other hand, after an active deceleration mode signal (a signal indicating to external devices that the motor controller 13 is to execute active deceleration mode; synchronized with the state of the safety request signal) from the motor controller 13 switches to an "ACT" state, the controller 11 stops output of the operation command to the motor control circuit part 31 and changes to a waiting state. Further, since the response from the controller 11 is delayed with respect to the state transitions of the active deceleration mode signal at this time, the higher control command is sometimes inputted in duplicate even after active deceleration mode has started within the motor controller 13. However, the internal deceleration command in active deceleration mode is given priority during this period.

Then, after the deceleration and stop control of the motor 2 by the internal deceleration command has ended, the motor controller 13 provides instructions for maintaining the driving position of the motor 2 to the motor control circuit part 31. With this, the /COIN signal switches to the low-level "ACT" state.

Note that, with such motor driving control in the form of a position command, the conditions for resuming normal operation from a motor stop state caused by active deceleration mode include the following: an "INACT" state of the safety signal request indicating that the state that put the operator at risk has been cleared by the closing of the above-described passage doors 19 and 20, for example; the amount of time that has passed is greater than or equal to the stop continuation time (the time period in which the stop position is to be held) set in parameters; and an "ACT" state of the /COIN signal indicating that the position deviation is within the above-described predetermined values.

Thus, once the conditions for resuming normal operation from the motor stop state caused by active deceleration mode are all satisfied, the above-described active deceleration mode signal from the motor controller 13 switches to an "INACT" state, and the controller 11 starts the restoration operation to resume normal operation. Further, when normal operation has been resumed by the controller 11, the motor controller 13 resumes position control with respect to the higher control command from the controller 11 and, due to the response delay of the motor driving position with respect to the higher control command, the position deviation shifts away from the above-described predetermined values, causing the /COIN signal to switch to an "INACT" state.

Figure 15:
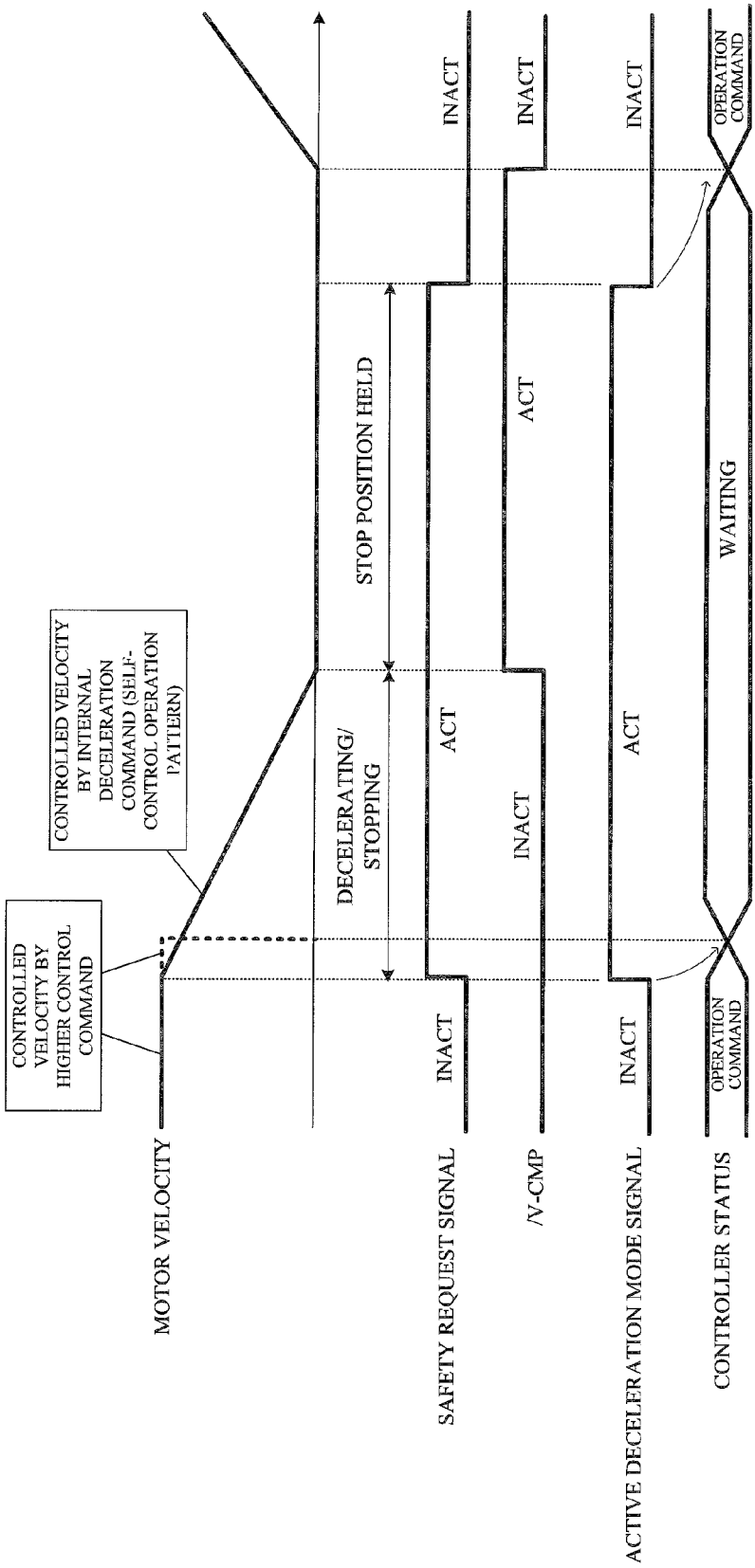
FIG. 15 is a diagram showing a time chart of the self-control operation pattern executed in active deceleration mode in a velocity command form.

FIG. 15 is a diagram showing a time chart of the self-control operation pattern executed in active deceleration mode in a velocity command form.

In FIG. 15, during normal operation in which the safety request signal maintains a low-level "INACT" state, the controller 11 outputs the target driving velocity of the motor 2 as a higher control command, and the motor control circuit part 31 in which this command is inputted calculates the driving torque of the motor 2 and performs the power supply control to the motor 2 so that the driving velocity of the motor 2 matches the target driving velocity. Further, during normal operation that is in accordance with the higher control command from the controller 11, a /V-CMP signal (described later) serving as an internal signal of the motor controller 13 continues to maintain a low-level "INACT" state.

Then, when the safety controller 12 switches the safety request signal to the high-level "ACT" state, the motor controller 13 immediately starts deceleration and stop control in active deceleration mode, and controls the deceleration and stopping of the motor 2 by an internal deceleration command based on the self-control operation pattern formed by parameters set by the user in advance. Although not particularly shown, the above-described self-control operation pattern is determined by parameters including deceleration rate, stop speed, and stop continuation time.

At this time, the motor controller 13 outputs an internal deceleration command in the form of a velocity command based on the above parameters to the motor control circuit part 31. Then, the motor control circuit part 31 controls the power supply so that the actual motor driving velocity based on the driving state amount detected by the position detector 3 matches the target driving velocity. The above-described /V-CMP signal is a signal indicating whether or not the velocity deviation between the actual motor velocity and the target velocity of the internal deceleration command falls within predetermined values of parameters set by the user in advance, i.e., indicates whether or not the actual motor velocity substantially matches the target velocity of the internal deceleration command. As soon as the motor controller 13 starts deceleration and stop control in active deceleration mode, this /V-CMP signal is in a low-level "INACT" state indicating that the velocity deviation has not yet fallen within the above-described predetermined values.

On the other hand, after the active deceleration mode signal (a signal indicating to external devices that the motor controller 13 is to execute active deceleration mode; synchronized with the state of the safety request signal) from the motor controller 13 switches to an "ACT" state, the controller 11 stops the output of the operation command to the motor control circuit part 31 and changes to a waiting state. Further, since the response from the controller 11 is delayed with respect to the state transitions of the active deceleration mode signal at this time, the higher control command is sometimes inputted in duplicate even after active deceleration mode has started within the motor controller 13. However, the internal deceleration command in active deceleration mode is given priority during this period. Then, after the deceleration and stop control of the motor 2 by the internal deceleration command has ended, the motor controller 13 provides instructions for maintaining the driving position of the motor 2 to the motor control circuit part 31. With this, the /V-CMP signal switches to the high-level "ACT" state.

Note that, with such motor driving control in the form of a velocity command, the conditions for resuming normal operation from a motor stop state caused by active deceleration mode include the following: an "INACT" state of the safety request signal indicating that the state that put the operator at risk has been cleared by the closing of the above-described passage doors 19 and 20, for example; the amount of time that has passed is greater than or equal to the stop continuation time (the time period in which the stop position is to be held) set in parameters; and an "ACT" state of the /V-CMP signal indicating that the velocity deviation is within the above-described predetermined values.

Thus, once the conditions for resuming normal operation from the motor stop state caused by active deceleration mode are all satisfied, the active deceleration mode signal from the motor controller 13 switches to an "INACT" state, and the controller 11 outputs an operation command to resume normal operation. Further, when normal operation has been resumed by the controller 11, the motor controller 13 resumes velocity control with respect to the higher control command from the controller 11 and, due to the response delay of the motor driving velocity with respect to the higher control command, the velocity deviation shifts away from the above-described predetermined values, causing the /V-CMP signal to switch to an "INACT" state.

As described above, according to the motor driving system 1 of this embodiment, regardless of the existence or non-existence of a system configuration that inputs a safety request signal to the controller 11, or the existence or non-existence of a function that outputs a higher control command in accordance with the higher control operation pattern of the controller 11 itself, the motor controller 13 is capable of reliably executing a predetermined deceleration and stop operation process in a predetermined state in which deceleration and stopping of the motor 2 are required, that is, intensively ensuring safety standard compliance with the motor controller 13 only.

Further, when an operation state in which the actual driving state amount of the motor 2 exceeds the operation monitoring pattern occurs, the comparing and monitoring part 41 of the safety module 14 is capable of detecting the state and taking suitable action, making it possible to more reliably ensure safety standard compliance.

As a result, the motor controller 13 and the safety module 14 of this embodiment are capable of accommodating the industrial machine S of variegated system configurations with versatility and readily ensuring safety as well as safety standard compliance.

While the motor controller 13 and the safety module 14 each separately comprise an independent CPU in the above embodiment, the aspect of the present invention is not limited thereto. For example, the motor controller 13 and the safety module 14 may be integrally incorporated so that control is performed using a single CPU. In such a case, the integrally designed motor controller inputs both a higher control command and a safety request signal, has both an operation monitoring pattern and a self-control operation pattern, and comprises a comparing and monitoring part. In such as case, safety standard compliance can be readily ensured using a single unit.

While the controller 11 and the safety controller 12 each separately comprise an independent CPU in the above embodiment, the aspect of the present invention is not limited thereto. For example, the controller 11 and the safety controller 12 may be integrally incorporated so that control is performed using a single CPU. In such a case, the integrally designed controller is connected to each of the sensors 15 and 16 and outputs both a higher control command and a safety request signal.

Further, in this embodiment in particular, the motor controller 13 comprises the HWBB 32, making it possible to execute the processing of an operation pattern that includes a step of shutting down the power supply to the motor 2 and, upon occurrence of an operation state in which the operation monitoring pattern is exceeded, activate the HWBB 32 to shut down the power supply to the motor 2 and reliably and quickly decelerate and stop the motor 2.

Further, in this embodiment in particular, the controller 11, the motor controller 13, and the comparing and monitoring part 41 are each capable of processing a plurality of types of operation patterns, making it possible to switch the operation pattern in accordance with the details of the state that puts the operator at risk and requires the deceleration and stopping of the motor 2, and further apply the same type of operation pattern to the controller 11, the motor controller 13, and the comparing and monitoring part 41, thereby avoiding inconsistencies therebetween.

Further, in this embodiment in particular, when the possibility exists that a variety of types of states that put the operator at risk may occur, requiring deceleration and stopping of the motor 2, the safety controller 12 can output safety request signals corresponding to each of the states. Then, the control part 11, the motor controller 13, and the comparing and monitoring part 41 can differentiate the respective safety request signals, that is, can process operation patterns in accordance with the differences in the states that put the operator at risk and require deceleration and stopping of the motor 2. Further, in a case where a plurality of states requiring deceleration and stopping of the motor 2 occurs in an overlapping manner, it is possible to perform processing in such a manner that combines the plurality of operation patterns in accordance with each state. With this arrangement, when the possibility exists that a plurality of types of states that put the operator at risk may occur, requiring deceleration and stopping of the motor 2, a system configuration capable of achieving real-time response to each of these states can be achieved.

Further, in this embodiment in particular, even in a case where a plurality of states that put the operator at risk and require deceleration and stopping of the motor 2 occurs in an overlapping manner, the operation pattern for reducing the velocity of the motor 2 that has the highest level of safety can be processed with priority regardless of the order in which the states occurred, making it possible to execute the deceleration and stopping operation of the motor 2 in a manner that is safest for the operator H.

Note that, in the aspect of the present invention, the application priority order of the operation patterns processed in an overlapping manner may be determined by a priority order set by the user in advance in addition to differences in safety. With the capable of arbitrarily setting the operation pattern priority order regardless of the order of occurrence, it is possible to execute the deceleration and stopping operation of the motor 2 in an operation form preferred by the user.

Further, in this embodiment in particular, in a case where a plurality of operation patterns is processed simultaneously, one of the patterns is applied with priority when the HWBB 32 is started to forcibly decelerate and stop the motor 2, making it possible to more reliably ensure safety standard compliance.

Further, in this embodiment in particular, the user can differentiate use of the above-described operation patterns of SBB, SBB-D, SPM-D, and SLS-D in controller deceleration mode, the self-control operation pattern based on parameter settings in active deceleration mode, and the operation monitoring pattern based on parameter settings used along with these operation patterns in accordance with the safety requirements of the system, making it possible to ensure high versatility of the industrial machine S, etc., comprising the motor driving system 1, as well as high safety in the outside area.

Further, in this embodiment in particular, the engineering tool 22 can be used to select operation patterns and arbitrarily set the parameter values that specify the specific timings and quantities of each operation pattern processing step, making it possible to set an operation pattern that is suitable to the configuration of the load machine 4 or to the system configuration of the industrial machine S, etc., comprising the motor driving system 1, thereby reliably ensuring safety standard compliance. Further, password-based security, etc., can be used to ensure that the setup and update operations performed using the engineering tool 22 cannot be easily executed by anyone other than an administrator, thereby increasing the reliability of the overall motor driving system 1 and further simplifying safety standard compliance.

Note that while the above has been described in relation to an illustrative scenario in which the comparing and monitoring part 41 of the safety module 14 starts the HWBB 32 to shut down the power supply to the motor 2 when the actual driving state amount of the motor 2 exceeds the operation monitoring pattern, the aspect of the present invention is not limited thereto, allowing the system to simply alert the user to such a state, for example. Further, the motor controller 13 may be provided with the functions of the safety module 14 as well, making it capable of inputting the safety request signal from the safety controller 12. Further, the controller 11 may be provided with the functions of the safety controller 12 as well, making it capable of inputting the detection signals from the sensors 15 and 16.

Further, in addition to the examples described above, the techniques of the above-described embodiment and exemplary modifications may be suitably combined as well.

Although other examples are not individually described herein, various changes and modifications can be made without departing from the spirit and scope of the aspect of the invention.

What is claimed is:

1. A motor driving system comprising:
a motor for driving a load machine;
a driving state amount detector that is mechanically connected to said motor and configured to detect a driving state amount related to said motor;
a motor control part configured to perform a power supply control to said motor;
a higher control part capable of outputting a higher control command to said motor control part and controlling said power supply control by said motor control part; and
a safety requesting part that inputs a safety request signal to said motor control part when predetermined conditions under which said motor should be decelerated or stopped are satisfied; wherein:
said motor control part comprises:
a motor control circuit part that performs said power supply control in accordance with a predetermined driving control command while referring to said driving state amount as a feedback signal;
a mode selecting and executing part configured to select and execute either a first safety function mode in which deceleration control or stop control of said motor is performed by inputting said higher control command that is in accordance with a predetermined higher control operation pattern to said motor control circuit part as said driving control command, or a second safety function mode in which deceleration control or stop control of said motor is performed by inputting an internal deceleration command generated inside said motor control part that is in accordance with a predetermined self-control operation pattern to said motor control circuit part as said driving control command, when said safety request signal is inputted; and
a comparing and monitoring processing part that compares said driving state amount and a predetermined operation monitoring pattern and monitors whether or not said driving state amount exceeds said operation monitoring pattern, when said safety request signal is inputted.

2. The motor driving system according to claim 1, wherein:
said motor control part comprises a power supply shutdown part that shuts down a power supply to said motor from said motor control circuit part when a power supply shutdown signal is inputted.

3. The motor driving system according to claim 2, wherein:
said comparing and monitoring processing part outputs said power supply shutdown signal to said power supply shutdown part when said driving state amount exceeds said operation monitoring pattern.

4. The motor driving system according to claim 3, wherein:
said comparing and monitoring processing part outputs said power supply shutdown signal to said power supply shutdown part at a predetermined timing after input of said safety request signal.

5. The motor driving system according to claim 1, wherein:
said higher control operation pattern of said higher control part, said self-control operation pattern of said motor control part, and said operation monitoring pattern of said comparing and monitoring processing part are all capable of applying a same plurality of types of operation patterns.

6. The motor driving system according to claim 5, wherein:
said safety requesting part is capable of outputting a plurality of said safety request signals; and
each of said higher control part, said motor control part, and said comparing and monitoring processing part applies the same types of operation patterns to said plurality of safety request signals and individually processes the applied plurality of operation patterns in parallel.

7. The motor driving system according to claim 6, wherein:
said higher control part, said motor control part, and said comparing and monitoring processing part apply an operation pattern of a higher priority set in advance when simultaneously processing said plurality of operation patterns.

8. The motor driving system according to claim 6, wherein:
said higher control part, said motor control part, and said comparing and monitoring processing part apply an operation pattern of a higher safety when simultaneously processing said plurality of operation patterns.

9. The motor driving system according to claim 6, wherein:
said higher control part, said motor control part, and said comparing and monitoring processing part, when said power supply shutdown signal is inputted to said power supply shutdown part in at least one of said plurality of operation patterns, apply the at least one operation patterns with priority, when simultaneously processing said plurality of operation patterns.

10. The motor driving system according to claim 5, wherein:
one type of the operation patterns is an operation pattern capable of achieving a safety base block function that inputs said power supply shutdown signal to said power supply shutdown part without waiting for any passage of time to shut down the power supply from said motor control circuit part to said motor.

11. The motor driving system according to claim 5, wherein:
one type of the operation patterns is an operation pattern capable of achieving a safety base block function with a delay that decelerates and stops said motor by a specified time and inputs said power supply shutdown signal to said power supply shutdown part after passage of said specified time to shut down the power supply from said motor control circuit part to said motor.

12. The motor driving system according to claim 5, wherein:
one type of the operation patterns is an operation pattern capable of achieving a safe position monitoring function with a delay that decelerates and stops said motor by a specified time and maintains a movement amount of said motor within a predetermined range after passage of said specified time.

13. The motor driving system according to claim 5, wherein:
one type of the operation patterns is an operation pattern capable of achieving a safety limit speed monitoring function with a delay that decelerates said motor by a specified time and maintains a velocity of said motor within a predetermined range after passage of said specified time.

14. The motor driving system according to claim 5, further comprising a setting part that enables selection of application of functional operation patterns for each of said higher control operation pattern, said self-control operation pattern, and said operation monitoring pattern respectively, as well as arbitrary setup of predetermined parameter values related to the selected operation patterns.

15. A motor controller that performs a power supply control to a motor based on a higher control command inputted from a higher control part, and receives a driving state amount related to said motor that is detected by a driving state amount detector mechanically connected to said motor, and a safety request signal outputted from a safety requesting part when predetermined conditions under which said motor should be decelerated or stopped are satisfied, said motor controller comprising:
a motor control circuit part that performs said power supply control in accordance with a predetermined driving control command while referring to said driving state amount as a feedback signal; and
a mode selecting and executing part configured to select and execute either a first safety function mode in which deceleration control or stop control of said motor is performed by inputting said higher control command that is in accordance with a predetermined higher control operation pattern to said motor control circuit part as said driving control command, or a second safety function mode in which deceleration control or stop control of said motor is performed by inputting an internal deceleration command generated inside said motor control part that is in accordance with a predetermined self-control operation pattern as said driving control command, when said safety request signal is inputted.

16. The motor controller according to claim 15, further comprising a comparing and monitoring processing part that compares said driving state amount and a predetermined operation monitoring pattern, and monitors whether or not said driving state amount exceeds said operation monitoring pattern, when said safety request signal is inputted.

17. A safety function expander that is connected to a motor control part comprising a motor control circuit part that performs a power supply control to a motor for driving a load machine, and a power supply shutdown part that shuts down the power supply to the motor when a power supply shutdown signal is inputted, wherein:
said safety function expander receives as inputs a driving state amount related to said motor that is detected by a driving state amount detector mechanically connected to said motor, and a safety request signal outputted from a safety requesting part when predetermined conditions under which said motor should be decelerated or stopped are satisfied; and
said safety function expander comprises a comparing and monitoring processing part that compares said driving state amount and a predetermined operation monitoring pattern, and outputs said power supply shutdown signal to said power supply shutdown part when said driving state amount exceeds said operation monitoring pattern, when said safety request signal is inputted.

18. A motor driving system comprising:
a motor for driving a load machine;
driving state amount detection means mechanically connected to said motor and configured to detect a driving state amount related to said motor;

motor control means configured to perform a power supply control to said motor;

higher control means capable of outputting a higher control command to said motor control means and controlling said power supply control by said motor control means; and safety requesting means that inputs a safety request signal to said motor control means when predetermined conditions under which said motor should be decelerated or stopped are satisfied; wherein:

said motor control means comprises:

motor control circuit means that performs said power supply control in accordance with a predetermined driving control command while referring to said driving state amount as a feedback signal;

mode selecting and executing means configured to select and execute either a first safety function mode in which deceleration control or stop control of said motor is performed by inputting said higher control command that is in accordance with a predetermined higher control operation pattern to said motor control circuit means as said driving control command, or a second safety function mode in which deceleration control or stop control of said motor is performed by inputting an internal deceleration command generated inside said motor control means that is in accordance with a predetermined self-control operation pattern to said motor control circuit means as said driving control command, when said safety request signal is inputted; and comparing and monitoring processing means that compares said driving state amount and a predetermined operation monitoring pattern and monitors whether or not said driving state amount exceeds said operation monitoring pattern, when said safety request signal is inputted.

\* \* \* \* \*